(12) United States Patent
Goodwin et al.

(10) Patent No.: US 11,894,004 B2
(45) Date of Patent: Feb. 6, 2024

(54) AUDIO CODER WINDOW AND TRANSFORM IMPLEMENTATIONS

(71) Applicant: DTS, Inc., Calabasas, CA (US)

(72) Inventors: Michael M. Goodwin, Scotts Valley, CA (US); Antonius Kalker, Mountain View, CA (US); Albert Chau, Vancouver (CA)

(73) Assignee: DTS, Inc., Calabasas, CA (US)

( * ) Notice: Subject to any disclaimer, the term of this patent is extended or adjusted under 35 U.S.C. 154(b) by 356 days.

(21) Appl. No.: 17/097,690

(22) Filed: Nov. 13, 2020

(65) Prior Publication Data

US 2021/0134309 A1    May 6, 2021

Related U.S. Application Data

(63) Continuation of application No. 15/967,248, filed on Apr. 30, 2018, now Pat. No. 10,847,169.

(60) Provisional application No. 62/492,011, filed on Apr. 28, 2017.

(51) Int. Cl.
  *G10L 19/02*  (2013.01)
  *G10L 19/022*  (2013.01)
  *G10L 25/45*  (2013.01)
  *G10L 19/26*  (2013.01)

(52) U.S. Cl.
  CPC ........ *G10L 19/0212* (2013.01); *G10L 19/022* (2013.01); *G10L 19/265* (2013.01); *G10L 25/45* (2013.01)

(58) Field of Classification Search
  CPC . G10L 19/0212; G10L 19/022; G10L 19/265; G10L 25/45
  See application file for complete search history.

(56) References Cited

U.S. PATENT DOCUMENTS

| 5,179,626 A | 1/1993 | Thomson |
| 6,226,608 B1 | 5/2001 | Fielder et al. |
| 7,308,401 B2 | 12/2007 | Tsushima et al. |
| 7,512,539 B2 | 3/2009 | Geiger et al. |
| 7,876,966 B2 | 1/2011 | Ojanpera |
| 7,974,837 B2 | 7/2011 | Tanaka |
| 8,126,951 B2 | 2/2012 | Huang et al. |
| 8,548,815 B2 | 10/2013 | Chivukula et al. |
| 8,682,645 B2 | 3/2014 | Taleb et al. |

(Continued)

FOREIGN PATENT DOCUMENTS

WO    WO-2018201113 A1    11/2018

OTHER PUBLICATIONS

"U.S. Appl. No. 15/967,248, 312 Amendment filed Oct. 6, 2020", 7 pgs.

(Continued)

*Primary Examiner* — Eric Yen
(74) *Attorney, Agent, or Firm* — Lerner David LLP

(57) ABSTRACT

An audio signal encoding method is provided comprising: receiving first and second audio signal frames; processing a second portion of the first audio signal frame and a first portion of the second audio signal frame using an orthogonal transformation to determine in part a first intermediate encoding result; and processing the first intermediate encoding result using an orthogonal transformation to determine a set of spectral coefficients that corresponds to at least a portion of the first audio signal frame.

9 Claims, 10 Drawing Sheets

(56) References Cited

U.S. PATENT DOCUMENTS

| | | | |
|---|---|---|---|
| 8,706,508 | B2 | 4/2014 | Suzuki et al. |
| 10,847,169 | B2 | 11/2020 | Goodwin et al. |
| 2004/0184537 | A1 | 9/2004 | Geiger et al. |
| 2004/0220805 | A1 | 11/2004 | Geiger et al. |
| 2005/0083216 | A1 | 4/2005 | Li |
| 2006/0115171 | A1 | 6/2006 | Geiger et al. |
| 2006/0161427 | A1* | 7/2006 | Ojala ................ G10L 19/24 704/E19.044 |
| 2006/0210180 | A1 | 9/2006 | Geiger et al. |
| 2006/0253209 | A1 | 11/2006 | Hersbach et al. |
| 2007/0174063 | A1 | 7/2007 | Mehrotra et al. |
| 2007/0194952 | A1 | 8/2007 | Breebaart et al. |
| 2008/0319739 | A1 | 12/2008 | Mehrotra et al. |
| 2009/0048852 | A1 | 2/2009 | Burns et al. |
| 2009/0083045 | A1 | 3/2009 | Briand et al. |
| 2009/0094038 | A1 | 4/2009 | Chivukula et al. |
| 2009/0240491 | A1 | 9/2009 | Reznik |
| 2009/0299754 | A1 | 12/2009 | Mehrotra |
| 2010/0309983 | A1 | 12/2010 | Jax |
| 2011/0060433 | A1 | 3/2011 | Dai et al. |
| 2011/0238426 | A1 | 9/2011 | Fuchs et al. |
| 2011/0246139 | A1 | 10/2011 | Kishi et al. |
| 2012/0232909 | A1 | 9/2012 | Terriberry et al. |
| 2012/0278088 | A1* | 11/2012 | Villemoes ........ G10L 19/0204 704/500 |
| 2015/0154971 | A1 | 6/2015 | Boehm et al. |
| 2015/0170670 | A1* | 6/2015 | Luyten ................ G10L 21/04 381/97 |
| 2015/0215574 | A1 | 7/2015 | Hinds |
| 2015/0332683 | A1 | 11/2015 | Kim et al. |
| 2016/0019913 | A1 | 1/2016 | Sugiyama et al. |
| 2016/0295128 | A1 | 10/2016 | Schnittman et al. |
| 2016/0372128 | A1 | 12/2016 | Baeckstroem et al. |
| 2018/0315435 | A1 | 11/2018 | Goodwin et al. |
| 2019/0005969 | A1 | 1/2019 | Dick et al. |
| 2020/0066287 | A1 | 2/2020 | Davis |
| 2021/0005209 | A1* | 1/2021 | Beack ................ G10L 21/038 |

OTHER PUBLICATIONS

"U.S. Appl. No. 15/967,248, Non Final Office Action dated Mar. 18, 2020", 14 pgs.

"U.S. Appl. No. 15/967,248, Notice of Allowance dated Jul. 6, 2020", 15 pgs.

"U.S. Appl. No. 15/967,248, PTO Response to Rule 312 Communication dated Oct. 27, 2020", 2 pgs.

"U.S. Appl. No. 15/967,248, Response filed Jun. 18, 2020 to Non Final Office Action dated Mar. 18, 2020", 8 pgs.

"European Application Serial No. 18790505.4, Extended European Search Report dated Dec. 22, 2020", 14 pgs.

"International Application Serial No. PCT/US2018/030061, International Preliminary Report on Patentability dated Nov. 7, 2019", 10 pgs.

"International Application Serial No. PCT/US2018/030061, International Search Report dated Aug. 31, 2018", 4 pgs.

"International Application Serial No. PCT/US2018/030061, Invitation to Pay Additional Fees dated Jun. 15, 2018", 4 pgs.

"International Application Serial No. PCT/US2018/030061, Written Opinion dated Aug. 31, 2018", 8 pgs.

Britanak, V, et al., "A Survey of Efficient MDCT Implementations in MP3 audio coding standard: Retrospective and state-of-the-art", Signal Processing 91(4), (2011), 624-672.

Geiger, et al., "Audio Coding based on Integer Transforms", AES Convention Paper No. 5471, [Online]. Retrieved from the Internet: <https//www.iis.fraunhofer.delcontentfdam/iis/de/doc/ame/conference/AES-111-Convention_Audio_CodingbasedonIntegerTransforms_AES5471.pdf>, (Nov. 30, 2001), 1-9.

Geiger, Ralf, "Audio Coding Based on Integer Transforms (Dissertation)", Technische Universitat I I menau, Germany, [Online]. Retrieved from the Internet: <URL: http://www.db-thueringen.de/servlets/DerivateSerlet/Derivate-13817/ilml-2007000278.pdf>, (2007), 132 pgs.

Geiger, Ralf, "Audio Coding Based on Integer Transforms", Dissertation zur Erlangung des akademischen Grades Doktor Technischen Universitat Ilmenau, pp. 1-99, [Online]. Retrieved from the Internet: <https//www.db-thueringeri.de/servlets/MCRFileNodeServlet/dbt_derivale_00013817/iln 1-2007000278.pdf>, (Nov. 2, 2007), 132 pgs.

Helmrich, Christian, et al., "Low-Delay Transform Coding Using the MPEG-H 3D Audio Codec", AES Convention 139. Paper 9355, (2015), 7 pgs.

Princen, J P, et al., "Subband/Transform Coding Using Filter Bank Designs Based on Time Domain Aliasing Cancellation", IEEE Proc. Intl. Conference on Acoustics, Speech, and Signal Processing (ICASSP), (1987), 2161-2164.

Virette, David, "Low Delay Transform for High Quality Low Delay Audio Coding", Signal and Image Processing. Universite de Rennes 1, [Online]. Retrieved from the Internet: <URL: https://hal.inria.fr/tel-01205574/document>, (2012), 197 pgs.

* cited by examiner

AUDIO CODER WINDOW AND TRANSFORM IMPLEMENTATIONS

CLAIM OF PRIORITY

This application is a Continuation of U.S. patent application Ser. No. 15/967,248, filed Apr. 30, 2018, which claims benefit of priority to U.S. Provisional Patent Application No. 62/492,011, filed on Apr. 28, 2017, which is incorporated by reference herein in its entirety.

BACKGROUND

Coding of audio signals for data reduction is a ubiquitous technology. High-quality, low-bitrate coding is essential for enabling cost-effective media storage and for facilitating distribution over constrained channels (such as Internet streaming). The efficiency of the compression is vital to these applications since the capacity requirements for uncompressed audio may be prohibitive in many scenarios.

Several existing audio coding approaches are based on sliding-window time-frequency transforms. Such transforms convert a time-domain audio signal into a time-frequency representation which is amenable to leveraging psycho-acoustic principles to achieve data reduction while limiting the introduction of audible artifacts. In particular, the modified discrete cosine transform (MDCT) is commonly used in audio coders since the sliding-window MDCT has properties that are inherently favorable for audio coding applications; in particularly, the sliding-window MDCT may be configured to achieve perfect reconstruction with overlapping nonrectangular windows without oversampling in the time-frequency representation.

While the time-frequency representation of an audio signal derived by a sliding-window MDCT provides an effective framework for audio coding, it is beneficial for coding performance to extend the framework such that the time-frequency resolution of the representation can be adapted based on the characteristics of the signal to be coded. For instance, such adaptation can be used to limit the audibility of coding artifacts. Several existing audio coders adapt to the signal to be coded by changing the window used in the sliding-window MDCT in response to the signal behavior. For tonal signal content, long windows are used to provide high frequency resolution; for transient signal content, short windows are used to provide high time resolution. This approach is commonly referred to as window switching.

Window switching approaches typically provide for short windows, long windows, and transition windows for switching from long to short and vice versa. It is common practice to switch to short windows based on a transient detection process. If a transient is detected in a portion of the audio signal to be coded, that portion of the audio signal is processed using short windows. It may be beneficial for coding performance, however, to allow for additional intermediate window sizes between short windows and long windows.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, an audio signal encoding method is provided. First and second audio signal frames are received in succession. A scaling windowing rotation is imparted to portions of the first and second audio signal frames to scale the second portion of the first audio signal frame and the first portion of the second audio signal frame based upon the second portion of the first window and the first portion of the second window. The result of the intermediate scaling windowing rotation is transformed to a first set of spectral coefficients that corresponds to the second portion of the first audio signal frame and a second set of spectral coefficients that corresponds to the first portion of the second audio signal frame.

In another aspect, an audio signal decoding method is provided. A set of spectral coefficients is received that corresponds to a second portion of a first audio signal frame and a first portion of a second audio signal frame. The set of spectral coefficients is transformed to a set of time-domain signal values. A scaling windowing rotation is imparted to the set of time-domain signal values, based upon a second portion of a first scaling window and a first portion of a second scaling window, to produce a second time-domain signal portion corresponding to a second portion of the first audio signal frame and a first time-domain signal portion corresponding to a first portion of the second audio signal frame.

In yet another aspect, an audio signal encoder is provided. A framer circuit is configured to receive an audio signal and to produce a corresponding succession of audio signal frames including a first frame followed next by a second frame. A windowing circuit is configured to impart a scaling windowing rotation to portions of the first and second audio signal frames to scale the second portion of the first audio signal frame and the first portion of the second audio signal frame based upon the second portion of the first window and the first portion of the second window, to produce an intermediate result. A transform circuit configured to transform the intermediate result to a first set of spectral coefficients that corresponds to the second portion of the first audio signal frame and a second set of spectral coefficients that corresponds to the first portion of the second audio signal frame.

In still another aspect, an audio decoder is provided. A transform circuit is configured to transform the first and second sets of spectral coefficients to a set of time-domain signal values. A windowing circuit is configured to impart a scaling windowing rotation to the set of time-domain signal values, based upon a second portion of the first window and a first portion of the second window, to produce a second time-domain signal portion corresponding to a second portion of the first audio signal frame and a first time-domain signal portion corresponding to a first portion of the second audio signal frame.

BRIEF DESCRIPTION OF THE DRAWINGS

Referring now to the drawings in which like reference numbers represent corresponding parts throughout.

DESCRIPTION OF EMBODIMENTS

In the following description of embodiments of an audio codec and method reference is made to the accompanying drawings. These drawings shown by way of illustration specific examples of how embodiments of the audio codec and method may be practiced. It is understood that other embodiments may be utilized and structural changes may be made without departing from the scope of the claimed subject matter.

Efficient audio coding requires the use of an appropriate signal-adaptive time-frequency resolution for representing the audio signal to be coded. Audio coders typically use long and short windows for tonal and transient content, respectively to achieve signal-adaptive time-frequency resolution. Efficient approaches to achieving signal-adaptive time-frequency resolution may use a multiplicity of different window lengths instead of only long and short windows.

Sliding Window MDCT Coder

Figure 1A:
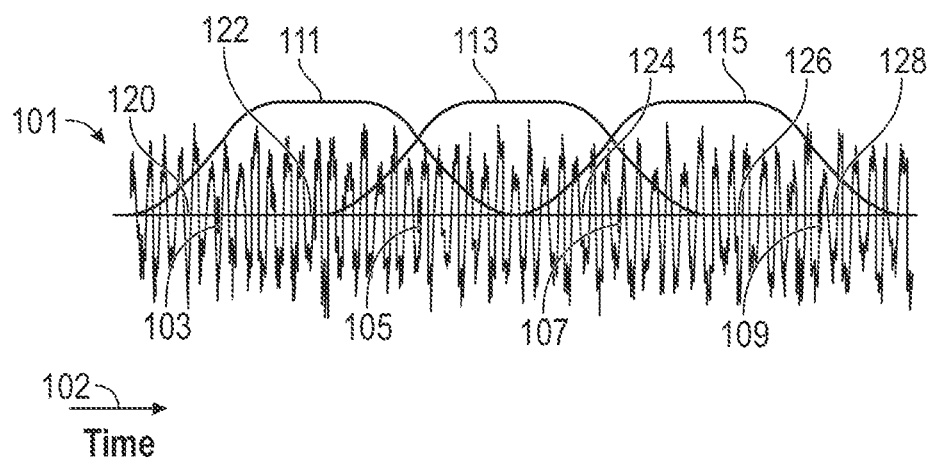
FIG. 1A is an illustrative drawing representing an example of an audio signal segmented into data frames and a sequence of windows time-aligned with the audio signal frames.
Figure 1B:
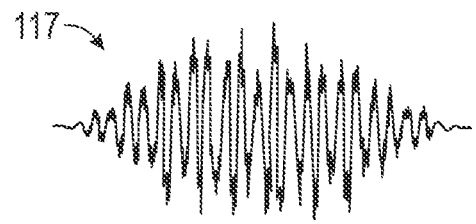
FIG. 1B is an illustrative example of a windowed signal segment produced by a windowing operation which multiplicatively applies a window to a segment of the audio signal encompassed by the window.

FIGS. 1A-1B are illustrative timing diagrams to portray operation of a windowing circuit block of a coder (not shown). FIG. 1A is an illustrative drawing representing an example of an audio signal segmented into data frames and a sequence of windows time-aligned with the audio signal frames. FIG. 1B is an illustrative example of a windowed signal segment 117 produced by a windowing operation, which multiplicatively applies a window 113 to a segment of the audio signal 101 encompassed by the window 113. A windowing block applies a window function to a sequence of audio signal samples to produce a windowed segment. More specifically, a windowing block produces a windowed segment by adjusting values of a sequence of audio signals within a time span encompassed by a time window according to an audio signal magnitude scaling function associated with the window. A windowing block may be configured to apply different windows having different time.

An audio signal 101 denoted with time line 102 may represent an excerpt of a longer audio signal or stream, which may be a representation of time-varying physical sound features. The audio signal is segmented into frames 120-128 for processing as indicated by the frame boundaries 103-109. A windowing block (not shown) multiplicatively applies the sequence of windows 111, 113, and 115 to the audio signal to produce windowed signal segments for further processing. The windows are time-aligned with the audio signal in accordance with the frame boundaries. For example, window 113 is time-aligned with the audio signal 101 such that the window 113 is centered on the frame 124 having frame boundaries 105 and 107.

The audio signal 101 may be denoted as a sequence of discrete-time samples x[t] where t is an integer time index. A windowing block audio signal value scaling function, as for example depicted by 111, may be denoted as w[n] where n is an integer time index. The windowing block scaling function may be defined in one embodiment as $$w[n] = \sin\left(\frac{\pi}{N}\left(n + \frac{1}{2}\right)\right) \quad (1)$$

for $0 \leq n \leq N-1$ where N is an integer value representing the window time length. In another embodiment, a window may be defined as $$w[n] = \sin\left(\frac{\pi}{2}\sin^2\left(\frac{\pi}{N}\left(n + \frac{1}{2}\right)\right)\right). \quad (2)$$

Other embodiments may perform other windowing scaling functions provided that the windowing function satisfies the certain conditions explained in section 4C of the Appendix. A windowed segment may be defined as $$x_i[n] = w_i[n]x[n+t_i]$$

where i denotes an index for the windowed segment, $w_i[n]$ denotes the windowing function used for the segment, and $t_i$ denotes a starting time index in the audio signal for the segment. In some embodiments, the windowing scaling function may be different for different segments. In other words, different windowing time lengths and different windowing scaling functions may be used for different parts of the signal 101, for example for different frames of the signal or in some cases for different portions of the same frame.

Figure 2:
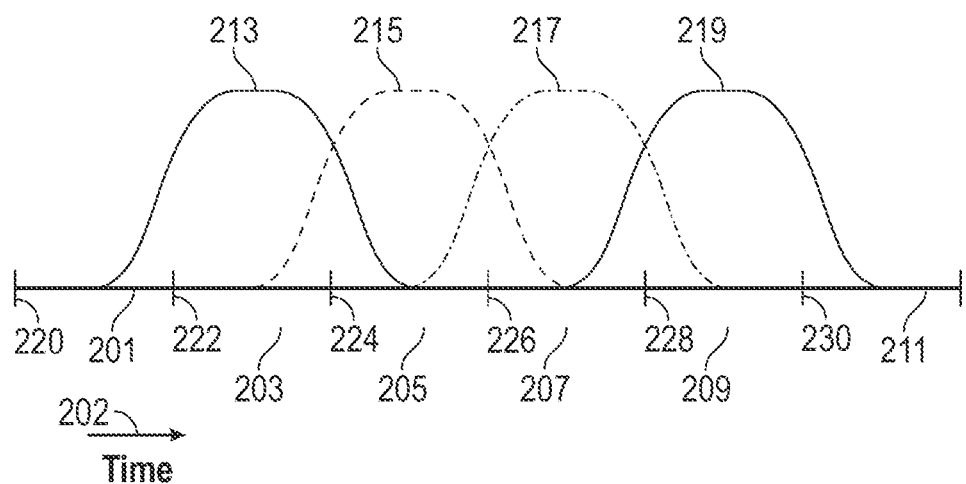
FIG. 2 is an illustrative example audio signal frame segmentation and a first sequence of example windows aligned with the frames.

FIG. 2 is an illustrative example of a timing diagram showing an audio signal frame segmentation and a first sequence of example windows aligned with the frames. Frames 203, 205, 207, 209, and 211 are denoted on time line 202. Frame 201 has frame boundaries 220 and 222. Frame 203 has frame boundaries 222 and 224. Frame 205 has frame boundaries 224 and 226. Frame 207 has frame boundaries 226 and 228. Frame 209 has frame boundaries 228 and 230. Windows 213, 215, 217 and 219 are aligned to be time-centered with frames 203, 205, 207, and 209, respectively. In some embodiments, a window such as window 213 which may span an entire frame and may overlap with one or more adjacent frames may be referred to as a long window. In some embodiments, an audio signal data frame such as 203 spanned by a long window may be referred to as a long-window frame. In some embodiments a window sequence such as that depicted in FIG. 2 may be referred to as a long-window sequence.

Figure 3:
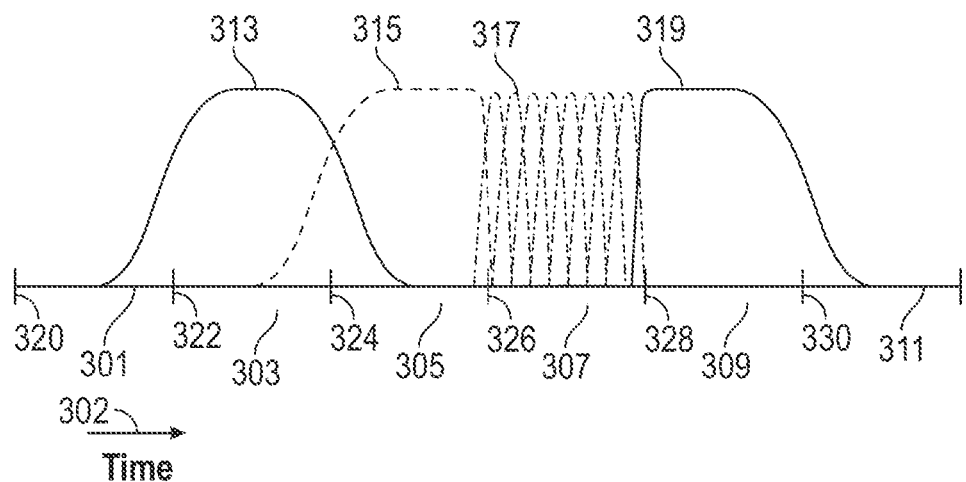
FIG. 3 is an illustrative example of a timing diagram showing audio signal frame segmentation and a second sequence of example windows time-aligned with the frames.

FIG. 3 is an illustrative example of a timing diagram showing audio signal frame segmentation and a second sequence of example windows time-aligned with the frames. Frames 301, 303, 305, 307, 309 and 311 are denoted on time line 302. Frame 301 has frame boundaries 320 and 322. Frame 303 has frame boundaries 322 and 324. Frame 305 has frame boundaries 324 and 326. Frame 307 has frame boundaries 326 and 328. Frame 309 has frame boundaries 328 and 330. Window functions 313, 315, 317 and 319 are time-aligned with frames 303, 305, 307, and 309, respectively. Window 313, which is time-aligned with frame 303 is an example of a long window function. Frame 307 is spanned by a multiplicity of short windows 317. In some embodiments, a frame such as frame 307, which is time-aligned with multiple short windows, may be referred to as a short-window frame. Frames such as 305 and 309 that respectively precede and follow a short-window frame may be referred as transition frames and windows such as 315 and 319 that respectively precede and follow a short window may be referred to as transition windows.

Figure 4:
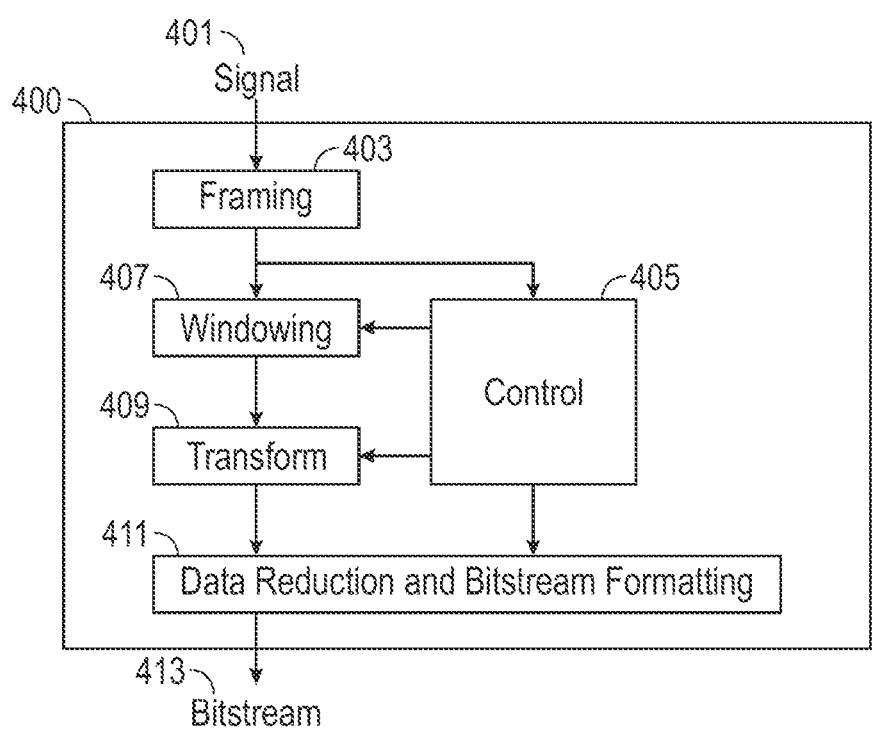
FIG. 4 is an illustrative block diagram showing certain details of an audio encoder architecture in accordance with some embodiments.

FIG. 4 is an illustrative block diagram showing certain details of an audio encoder architecture 400 in accordance with some embodiments. An audio signal 401 including discrete-time audio samples is input to the encoder 400. The audio signal may for instance be a monophonic signal or a single channel of a stereo or multichannel audio signal. A framing circuit block 403 segments the audio signal 401 into frames including a prescribed number of samples; the number of samples in a frame may be referred to as the frame size or the frame length. Framing block 403 provides the signal frames to control circuit block 405 and the windowing circuit block 407. The control block may analyze one or more frames and provide analysis results to the windowing block 407, a transform circuit block 409, and a data reduction and formatting circuit block 411. Analysis results provided to the windowing block 407 may indicate a sequence of windowing operations for the windowing block 407 to apply to a sequence of frames of audio data. The windowing block 407 may indicate a sequence of scaling windows to apply to a sequence of frames of audio data; the windowing block 407 may also indicate a corresponding sequence of time indices at which to apply the respective scaling windows to the audio data. The control block 405 may cause the windowing block 407 to apply different scaling operations and different window time lengths to different audio frames, for example. Some audio frames may be scaled according to long windows. Others may be scaled according to short windows and still others may be scaled according to transition windows, for example. In some embodiments, the control block 405 may include a transient detector (not shown) to determine whether an audio frame contains transient signal behavior. For example, in response to a determination that a frame includes transient signal behavior, control block 405 may indicate a sequence of windowing operations consisting of short windows to apply.

The windowing block 407 applies windowing functions to the audio frames to produce windowed audio segments and provides the windowed audio segments to the transform block 409. Analysis results provided by the control block 405 to the transform block 409 may include transform sizes for the transform block 409 to use in processing the windowed audio segments. In some embodiments, the transform sizes provided by the control block 405 to the transform block 409 may correspond to the window sizes provided by the control block 405 to the windowing block 407. As will be understood by those of ordinary skill in the art, the output of the transform block 409 and results provided by the control block 405 may be processed by a data reduction and formatting block 411 to generate a data bitstream 413 which represents the input audio signal. In some embodiments, the data reduction and formatting may include the application of a psychoacoustic model and information coding principles as will be understood by those of ordinary skill in the art. The audio encoder 400 may provide the data bitstream 413 as an output for storage or transmission to a decoder (not shown) as explained below. The transform block 409 may be configured to carry out a MDCT, which may be defined mathematically as:

$$X_i[k] = \sum_{n=0}^{N-1} x_i[n] \cos\left(\frac{2\pi}{N}\left(n + \frac{N}{4} + \frac{1}{2}\right)\left(k + \frac{1}{2}\right)\right) \quad (3)$$

where $$0 \le k \le \frac{N}{2} - 1$$

and where the values $x_i[n]$ are windowed time samples, i.e. time samples of a windowed audio segment. The values $X_i[k]$ may be referred to generally as transform coefficients or specifically as modified discrete cosine transform (MDCT) coefficients. In accordance with the definition, the MDCT converts N time samples into $$\frac{N}{2}$$

transform coefficients. For the purposes of this specification, the MDCT as defined above is considered to be of size N. Conversely, an inverse modified discrete cosine transform (IMDCT), which may be performed by a decoder (not shown), may be defined mathematically as:

$$\hat{x}_i[n] = \sum_{i=0}^{N/2-1} X_i[k] \cos\left(\frac{2\pi}{N}\left(n + \frac{N}{4} + \frac{1}{2}\right)\left(k + \frac{1}{2}\right)\right) \quad (4)$$

where $0 \le n \le 0.5 N-1$. As those of ordinary skill in the art will understand, a scale factor may be associated with one or both of the MDCT or the IMDCT. Additional mathematical details about the scale factor in the MDCT and IMDCT are provided in the Appendix in section 2F.

In typical embodiments, a transform operation such as an MDCT is carried out by transform block 409 for each windowed segment of the input signal 401. This sequence of transform operations converts the time-domain signal 401 into a time-frequency representation comprising MDCT coefficients corresponding to each windowed segment. The time and frequency resolution of the time-frequency representation are determined at least in part by the time length of the windowed segment and the size of the associated transform carried out on the windowed segment. In some embodiment, transform size corresponds to window length. For a windowed segment corresponding to a long time-length window, for example, the resulting time-frequency representation has low time resolution but high frequency resolution. For a windowed segment corresponding to a short time-length window, for example, the resulting time-frequency representation has relatively higher time resolution but lower frequency resolution than a time-frequency representation corresponding to a long-window segment. In some cases, a frame of the signal 401 may be associated with more than one windowed segment, as illustrated by the example frame 307 of FIG. 3, which is associated with multiple short windows, each used to produce a windowed segment for a corresponding portion of frame 307.

Sliding-Window MDCT Coder with Windowing Operations Aligned to Window Centers

Figure 5:
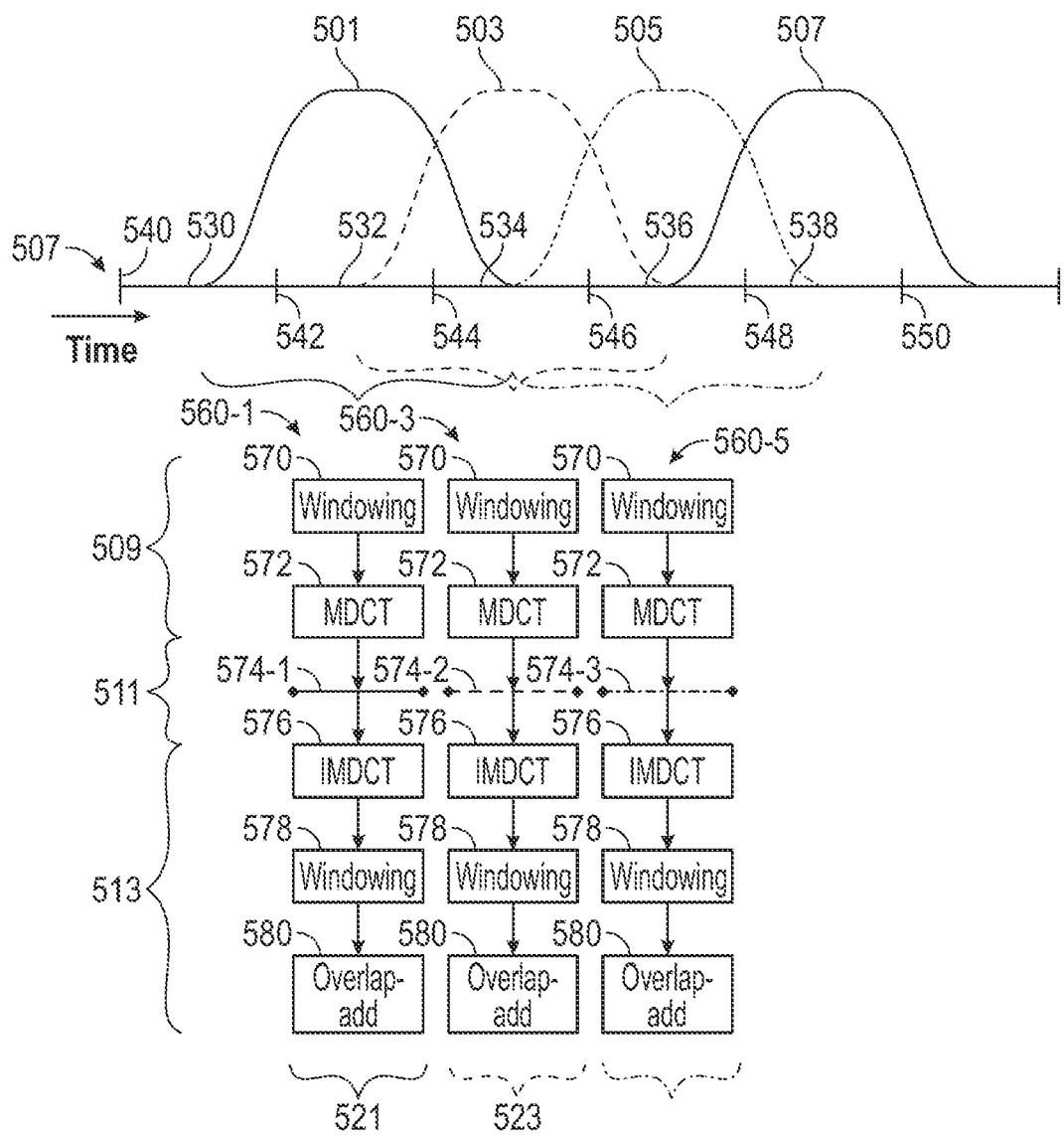
FIG. 5 is an illustrative drawing showing first encoder and first decoder (first coder) pipelines to code a sequence of audio data frames to which a corresponding sequence of windows is aligned.

FIG. 5 is an illustrative drawing showing first encoder 509 and first decoder 513 (first coder) pipelines 560-1, 560-3, and 560-5 to code a sequence of sequence of audio data frames 530-536 that are aligned with a corresponding sequence of windows 501, 503, 505 and 507. The encoder architecture 400 of FIG. 4 is used in the first encoder 509. The coder 509/513 uses a sliding-window MDCT. The illustrative example windows 501-507 are equal in time length, although windows with different time lengths may be used as explained above. Each window spans portions of three audio signal data frames and one of the three frames that it spans is centered within the window. For example, window 501 spans portions of frames 530, 532 and 534, with frame 532 window-centered within window 501. Frame 530 is partially encompassed by time window function 501 since its left frame time boundary 540 is outside the time window 501 while its right frame time boundary 542 is within the time window 501. Similarly, frame 534 is partially encompassed by time window function 501 since its right frame time boundary 546 is outside the time window 501 while its left frame time boundary 544 is within the time window 501. Window-centered frame 532 is fully encompassed and centered within time window 501 since its left and right frame boundaries 542, 544 are within the time window 501.

Each coder pipeline is aligned with a window center. A coder pipeline 560-1, for example, is configured to generate coding representing window 501, which entirely spans frame 532 and which spans portions of frames 530 and 532. A coder pipeline 560-3, for example, is configured to generate coding representing window 503, which entirely spans frame 534 and which spans portions of frames 532 and 536. A coder pipeline 560-5 is configured to generate coding representing window 505, which entirely spans frame 536 and which spans portions of frames 534 and 538. It will be appreciated that although the illustrative sequence of windows 501, 503, 505 and 507 shown in FIG. 5 include only long windows, the first encoder 509 and first decoder 513 (first coder) may be configured to implement multiple pipelines (not shown) centered at multiple corresponding short windows that collectively span a single frame, for example.

It will be understood that the encoder 509 and the decoder 513 may operate independently. Transform coefficients produced by the encoder 509 may be transmitted over a communication system to the decoder 513. A signal processing circuit (such as the machine described with reference to FIG. 14) may be configured to configure the encoder 509 in each of pipeline configurations 560-1, 560-3, 560-3 in time sequence. Likewise, a signal processing circuit (not shown) may be configured to configure the decoder 513 in each of pipeline configurations 560-1, 560-3, 560-3 in time sequence. Moreover, it will be understood by those of ordinary skill in the art, the encoder 509 in FIG. 5 depicts only the window and transform components of an encoder and does not depict other components such as data reduction or bitstream formatting which may be present in an encoder. Likewise, the decoder 513 depicts only the inverse transform, window, and overlap-add components of a typical decoder and does not depict other components such as bitstream reading which may be present in a decoder.

Consider for example the processing of the frame 534, which window 503 is centered upon. The encoder 509 includes windowing block 570 configured to apply the window 503 to audio samples within frame 534 and to audio samples within portions of the preceding frame 532 and portions of the subsequent frame 536, which are partially encompassed by window 503, to generate a windowed segment. The encoder includes an MDCT block 572 configured to produce transform coefficients 574-2 corresponding to time window 503 based upon the windowed segment produced by the windowing block 503. The decoder 513 includes an Inverse MDCT (IMDCT) block 576 to produce IMDCT output time-domain signal values based upon the transform coefficients 574-2 and includes a windowing block 578 configured to apply the window 503 to the IMDCT output time-domain signal values to produce a windowed result. In some embodiments, the window 578 applied after the IMDCT is the same as the window 572 applied before the MDCT; in other embodiments, they may be different. The decoder 513 includes an overlap-add block 580 configured to overlap and add the windowed result for frame 534 with a windowed result from a previous frame 532 associated with a previous window 501. The result of the overlap-add with the previous frame is that an indicated output segment 523 is constructed. Those of ordinary skill in the art will understand that overlap-add with the previous frame 532 (associated with window 501) obtains the benefit of time-domain aliasing cancellation in generating output samples for the segment 523 associated in part with the time window 503.

MDCT Coder with Windowing Operations Aligned to Window Transitions

Figure 6:
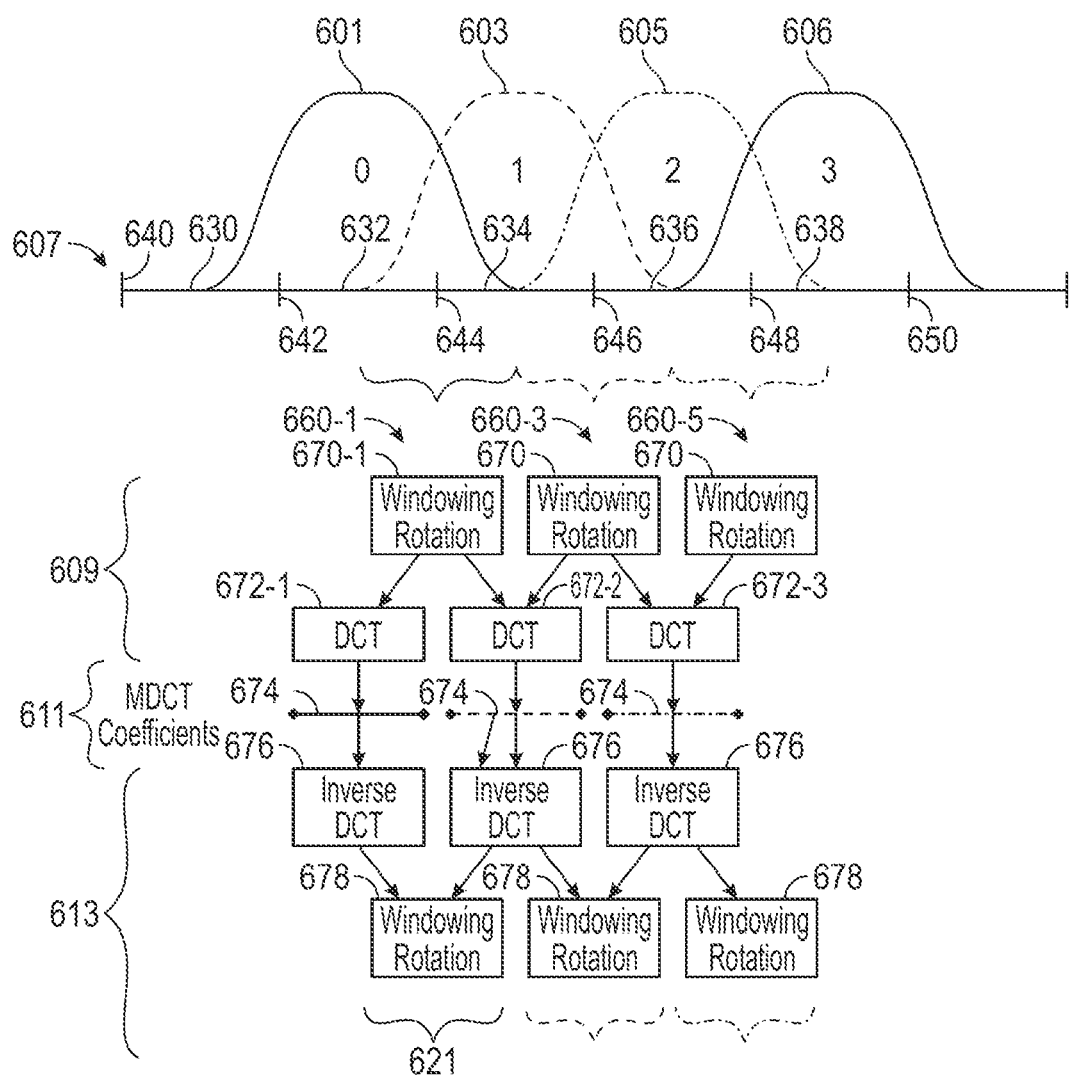
FIG. 6 is an illustrative drawing showing second encoder and second decoder (second coder) pipelines to code a sequence of sequence of audio data frames to which a corresponding sequence of windows is aligned.

FIG. 6 is an illustrative drawing showing second encoder 609 and second decoder 613 (second coder) pipelines 660-1, 660-3, and 660-5 to code a sequence of sequence of adjacent audio data frames 630-636 that are aligned with a corresponding sequence of windows 601, 603, 605 and 607. The encoder architecture 400 of FIG. 4 is used in the second encoder 609. The coder 609/613 uses an MDCT. The illustrative example windows 601-607 are equal in time length, although windows with different time lengths may be used as explained below. Each window spans portions of three audio signal data frames and one of the three frames that it spans is centered within the window. For example, window 601 spans portions of frames 630, 632 and 634, with frame 632 centered within window 601. Frame 630 is adjacent to frame 632 and frame 632 is adjacent to frame 634. Frame 630 is partially encompassed by time window function 601 since its left frame time boundary 640 is outside the time window 601 while its right frame time boundary 642 is within the time window 601. Similarly, frame 634 is partially encompassed by time window function 601 since its right frame time boundary 646 is outside the time window 601 while its left frame time boundary 644 is within the time window 601. Window-centered frame 632 is fully encompassed and centered within time window 601 since its left and right frame boundaries 642, 644 are within the time window 601.

Each frame time boundary is aligned with an instance of the coder pipeline. Each coder pipeline instance is configured to generate coding results based upon adjacent half-frames and corresponding adjacent half-windows. More specifically, a first transform block 672-1, which is part of a first coder pipeline 660-1, is aligned with frame 632; a second transform block 672-2 which is part of a second coder pipeline 660-3, is aligned with frame 634; and a third transform block 672-3 which is part of a third coder pipeline 660-5, is aligned with frame 636. coder pipeline 660-1 is centered on frame time boundary 644 and is configured to generate coding results based in part upon a second-half windowed segment generated using second-half of window 601, second half of frame 632, and first half of frame 634, and a first-half windowed segment generated using first-half of window 603, first half of frame 634, and second half of frame 632. A coder pipeline 660-3 is centered on frame time boundary 646 and is configured to generate coding results based in part upon a second-half windowed segment generated using second-half of window 603, second half of frame 634, and first half of frame 636, and a first-half windowed segment generated using first-half of window 605, first half of frame 636, and second half of frame 634. A coder pipeline 660-5 is centered on frame time boundary 648 and is configured to generate coding results based in part upon a second-half windowed segment generated using second-half of window 605, second half of frame 636, and first half of frame 638, and a first-half windowed segment generated using first-half of window 607, first half of frame 638, and second half of frame 636.

It will be understood that the encoder 609 and the decoder 613 may operate independently. Coefficients produced by the encoder 609 may be transmitted over a communication system to the decoder 613. A signal processing circuit (such as the machine described with reference to FIG. 14) may be configured to configure the encoder 609 in each of pipeline configurations 660-1, 660-3, 660-5 in time sequence. Likewise, a signal processing circuit (not shown) may be configured to configure the decoder 613 in each of pipeline configurations 660-1, 660-3, 660-5 in time sequence. Moreover, as will be understood by those of ordinary skill in the art, the encoder 609 in FIG. 6 depicts only the window and transform components of an encoder and does not depict other components such as data reduction or bitstream formatting which may be present in an encoder. Likewise, the decoder 613 depicts only the inverse transform, window, and overlap-add components of a typical decoder and does not depict other components such as bitstream reading which may be present in a decoder.

Consider for example the first pipeline instance 660-1 processing of the second portion of window 601 and second portion of frame 632 together with the first-portion of window 603 and first portion of frame 634. The encoder 609 includes windowing block 670 configured to impart a windowing rotation operation on the second portion of frame 632 and the first portion of frame 634 based upon the second portion of window 601 and the first portion of window 603 so as to produce an windowing rotation result. More particularly, in some embodiments, a scaled portion of an input signal may be combined with a corresponding portion of an input signal scaled and folded about a frame time boundary to form an intermediate time-aliased time-domain signal. The frame time boundary acts as a fixed point about which the rotation occurs. In some embodiments, the scaling, folding, and combination may be realized via a windowing rotation operation. Moreover, in accordance with some embodiments, a vector of samples corresponding to a concatenation of the adjacent half-frames, a second half of frame 632 and first half of frame 634, is processed by a rotation matrix that corresponds in part to the windowing operations as explained in Appendix A. In particular, sections 3 and 4A of the Appendix provide a mathematical formulation of the windowing operation of the encoder 609 as a rotation matrix. In particular, Eq. (27) provides a mathematical formulation of the scaling, folding, and combination operations which may be realized via a windowing rotation operation. In particular, the submatrix in the box Eq. (26) is the "windowing rotation" of the FIG. 6 pipeline and the FIG. 7 flowchart. Eq. (24) shows the DCT applied to the results of the windowing. This is the transform (DCT) in FIG. 6 and FIG. 7.

A transform block 672 accepts as input an intermediate encoding result corresponding to a concatenation of portions of the windowing rotation results from adjacent transitions. The transform block then transforms the concatenated windowing rotation result (the intermediate encoding result) by a discrete cosine transform (DCT) to produce DCT transform coefficients 674, also referred to as spectral coefficients. In some embodiments, a variation of a DCT known as a DCT-IV is used, which is known to those of ordinary skill in the art. The DCT transform coefficients likewise correspond to MDCT transform coefficients as explained mathematically in the Appendix. In the decoder section 613, an inverse DCT-IV transform may be performed in block 676 to produce an intermediate decoding result, which is subsequently provided in part to adjacent windowing rotation blocks 678. A windowing rotation block 678 may receive concatenated intermediate decoding results from adjacent inverse DCT blocks. The windowing rotation block 678 may processes the intermediate decoding results to perform windowing and overlap-add functions to generate output samples representing the second half of frame 632 and the first half of frame 634 for the output portion indicated by 621.

Figure 7:
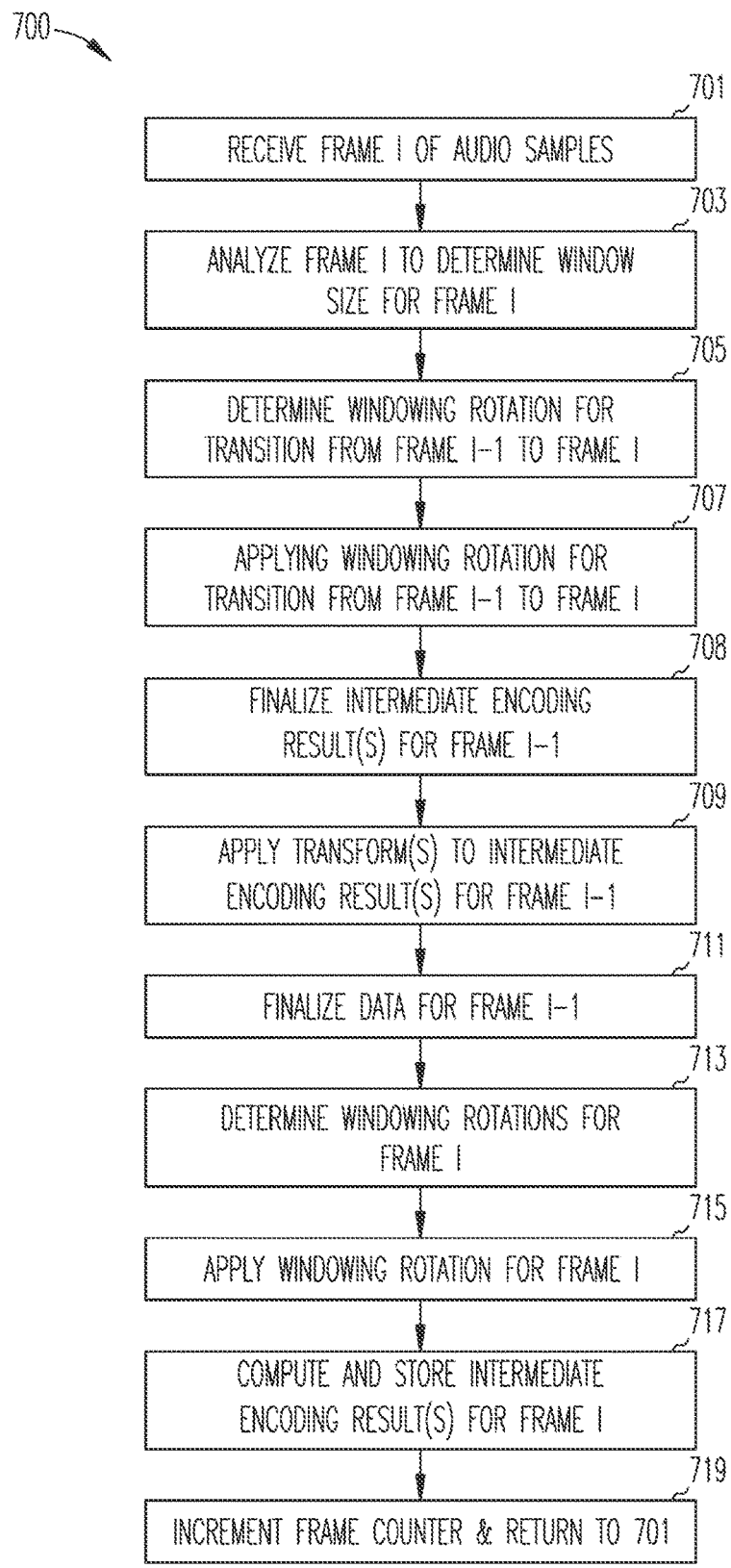
FIG. 7 is an illustrative flow diagram representing a process performed by the encoder architecture of FIG. 4 in the second encoder embodiment of FIG. 6.

FIG. 7 is an illustrative flow diagram representing process 700 performed by the encoder architecture 400 of FIG. 4 within the second encoder 609 of FIG. 6. A processing system (such as the machine described with reference to FIG. 14) may be configured with executable instructions to perform the operations of process 700. At operation 701 framing block 403 receives frame $F_i$ of audio samples. At operation 703, control block 405 evaluates the samples of frame $F_i$ to determine a window size for frame $F_i$. At operation 705, windowing block 407/670 determines a windowing rotation for a transition from a previously received frame $F_{i-1}$ to frame $F_i$. At operation 707, the windowing block 407/670 may apply a windowing rotation operation based on the transition from frame $F_{i-1}$ to frame $F_i$. The windowing rotation operation may combine (1) a scaled version of the audio samples of a least a portion of the second half of frame $F_{i-1}$ and audio samples of at least a portion of the first half of frame $F_i$, where the scaling may be based upon the determined windowing transition from frame $F_{i-1}$ to frame $F_i$ with (2) a scaled and time-aliased version of the audio samples of at least a portion of the second half of frame $F_{i-1}$ and audio samples of at least a portion of the first half of frame where the scaling may be based upon the determined windowing transition from frame $F_{i-1}$ to frame $F_i$ and may include negation.

At operation 708, an intermediate encoding result may be formed by combining a portion of the windowing rotation for the transition from frame i-1 to frame i with a portion of the windowing rotation for the preceding window transition, for instance that from frame i-2 to i-1. In some cases, the preceding window transition may correspond to a window contained entirely within frame i-1. In some cases, finalizing the intermediate encoding results from frame i-1 in step 708 includes aggregating intermediate encoding results formed in step 717 for the previous iteration of the process. At operation 709, transform block 409/672 applies a DCT transform respectively to one or more intermediate encoding results for frame $F_{i-1}$. At operation 711, the data for frame i-1 may be finalized, which may include providing the data to data reduction and bitstream formatting block 411. At operation 713, windowing block 407/670 determines subsequent windowing rotations for frame $F_i$ if the control block 405 has indicated that multiple windows should be applied for frame $F_i$. For example, if frame $F_i$ is a long-window frame, operation 713 does not involve any further processing. If frame $F_i$ is a short-window frame, for example, operation 713 determines windowing rotations for the short windows that are contained within the frame boundaries of frame $F_i$. At operation 715, the windowing rotations for any windows that are contained within the frame boundaries of frame $F_i$ are applied. At operation 717, the results of the windowing rotations for windows within the frame boundaries of frame $F_i$ are combined to form intermediated encoding results. The operation 717 may pertains to shorter windows. At operation 719, the frame counter is incremented and the process repeats for the next frame starting at operation 701.

It will be appreciated that the windowing block 670 and transform block 672 may start processing for a first half of a frame before the subsequent frame has been received. Moreover, part-way through processing of a frame, the control block 405 may determine that a different window shape should be used for a latter half of the frame than for the former half of the frame, and may instruct the windowing block 670 to associate a different window function with a second half of the frame. For example, the control block 405 may determine that audio data for a subsequent frame has a different characteristic requiring a different window and may in accordance with that determination, indicate that a latter half of a frame be processed with a different window shape in preparation for a transition to the window determined for the subsequent frame. For example, shorter windows are used for transients. In response to a determination by the control block 405 that a subsequent frame contains transients, a transition window may be applied to the latter half of the current frame. Thus, less lookahead for window planning is required since a window can be changed during the processing of a frame. As a result, lower signal processing latency can be achieved since processing of a frame can start before the subsequent frame is received. In contrast, in the first encoder 509 and first decoder 513 of FIG. 5, for example, a subsequent frame typically must be received before starting any processing for the current frame since a window for a current frame ordinarily overlaps the subsequent frame and the entire window is applied before performing an MDCT. In accordance with some embodiments as depicted in FIG. 6, the windowing rotation and MDCT transform operations in an audio encoder 609 may be realized as orthogonal matrix multiplications. In accordance with some embodiments as depicted in FIG. 6, the IMDCT transform and windowing rotation operations in an audio decoder 613 may be realized as orthogonal matrix multiplications. In some embodiments, realization of operations as orthogonal matrix operations may provide computational benefits. In some embodiments, orthogonal matrix operations may be realized as integer transforms, which may be beneficial in implementations using fixed-point arithmetic.

Figure 8:
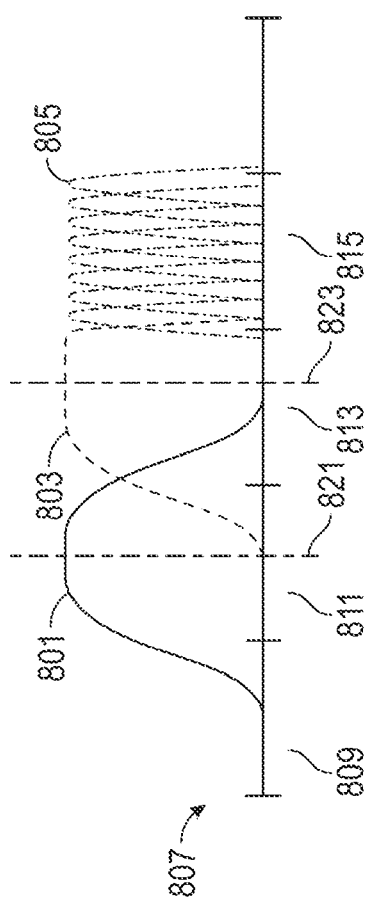
FIG. 8 is an illustrative drawing that depicts a window sequence consisting of a long window, a long-to-short transition window, and short windows, associated respectively with audio signal frames in a frame segmentation.

FIG. 8 is an illustrative drawing that depicts a window sequence consisting of a long window 801, a long-to-short transition window 803, and short windows 805, associated respectively with audio signal frames 811, 813, and 815 in a frame segmentation 807. The midpoint of frame 811 is indicated by the dashed line 821 and the midpoint of frame 813 is indicated by the dashed line 823. In a –window transform embodiment as depicted in FIG. 5, the audio signal frames 809, 811, and 813 must all be available for processing before the window 801 is applied because the long window 801 spans all or part of each of those frames. In other words, in the embodiment of FIG. 5, the MDCT of the windowed segment generated by applying window 801 cannot be carried out until frame 813 is available for processing. Similarly, in the embodiment of FIG. 5, frame 815 must be available for processing before window 803 can be applied and its associated MDCT of the windowed segment generated by applying window 803 can be carried out. Furthermore, in the embodiment of FIG. 5, frame 815 must be analyzed to determine an appropriate window size for frame 815 before any processing can be carried out for frame 813. In the embodiment of FIG. 5, the window size for frame 815 is required prior to processing frame 813 because the frame 815 window constrains the shape of the transition window 803, which must be determined before any processing can be initiated for frame 813.

In the embodiment of FIGS. 6-7, processing can be initiated for audio signal frame 811 before audio signal frame 813 has been received. This is possible because the initial processing for frame 811, namely the windowing rotations for the first half of the frame, depends only on the first half of frame 811 as indicated in FIGS. 6-7 and explained mathematically in Appendix A in Sections 3 and 4. For example, Eq. (22) shows that the windowing rotations for the first half of a frame can be processed before carrying out any processing on the second half of the frame. The top half of the x vector, which consists of segments $x_{02}$ and $x_{11}$, can be processed by the top left block matrix without using the segments $x_{12}$ or $x_{21}$.

Similarly, in the embodiment of FIGS. 6-7, frame 815 need not be available before processing is initiated for frame 813. The window size for frame 815 need not be determined before initiating the processing of frame 813 because the windowing operations for the first half of frame 813 can be processed independently of the window shape of the second half of the frame. Moreover, in the embodiment of FIGS. 6-7, the second half of frame 813 can be processed to conclude the derivation of MDCT coefficients for frame 813 after frame 815 has been received and analyzed to determine a window size for frame 815, which indicates a window shape for the second half of frame 813.

Figure 9:
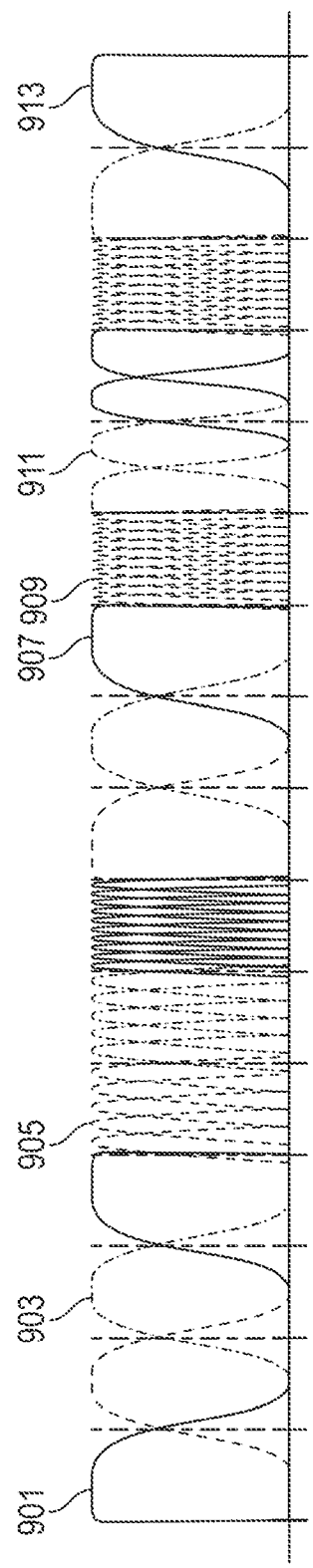
FIG. 9 is an illustrative drawing that depicts an example frame segmentation and a corresponding window sequence in accordance with some embodiments.

FIG. 9 is an illustrative drawing that depicts an example frame segmentation and a corresponding window sequence in accordance with some embodiments. Across the numerous frames in the depiction, a variety of window options in accordance with some embodiments are illustrated. The window sequence includes a start window 901, a long window 903, a series of four windows (905) spanning a frame, a transition window 907, a series of eight windows (909) collectively spanning a frame, a series of two windows (911) spanning a frame (the first of which being a transition window), and a stop window 913.

When there are multiple windows within a frame, the first window straddles the beginning-of-frame boundary. Pipeline processing of successive windows may continue through the frame, from one window to the next, with a selected window and MDCT transform size. The windowing rotation of the pipeline processing is centered on the transitions between successive windows. The processing pipeline runs for each window transition within the frame. The last window in the frame straddles the end-of-frame boundary.

In some embodiments, all frames may be spanned by a number of windows that corresponds to a power of two. In some embodiments, each window may be processed by an MDCT that generates half as many spectral coefficients as the window length. Thus, each frame may be represented by the same number of spectral coefficients independent of the window size used to process the frame. In an example embodiment, the frame size N may be 1024. For a long-window frame, a single long window may span 2048 time-domain samples from the respective long-window frame and the adjacent frames; the corresponding MDCT may generate 1024 spectral coefficients. For a short-window frame, a short window may span 256 time-domain samples such that 8 overlapping short windows span the frame. An MDCT corresponding to a short window may generate 128 spectral coefficients. Considering that the short-window frame may consist of 8 windows, for each of which a corresponding MDCT may generate 128 spectral coefficients, a total of 1024 spectral coefficients may be generated for a short-window frame. In this example and in other examples that appropriately constructed, the number of spectral coefficients generated may be equivalent for a long-window frame and for frames consisting of multiple windows. In some embodiments, this regularity may be advantageous in that the bitstream formatting (such as that carried out in block 411) may be consistent for all frames independent of the window size used to process the frame. In prior approaches to window switching, the data rate may be significantly different for different window types. In some embodiments, the regularity may be advantageous in that the data reduction steps (such as those carried out in block 411) may employ commonly structured processes such as vector quantizers independent of the window size used to process the frame.

In some embodiments, using window sizes that are related by powers of two may improve the efficiency of the implementation of the associated transforms in that transforms with sizes related by powers of two may share common processing components. In some embodiments, a start window such as window 901 may be used to process the beginning of a signal. In some embodiments, a stop window such as 913 may be used to process the end of a signal. In some embodiments, a stop window and a start window may be used in succession at an intermediate point in a signal to form a sync point, such as that shown in FIG. 13(*d*), which is discussed below.

Figure 10:
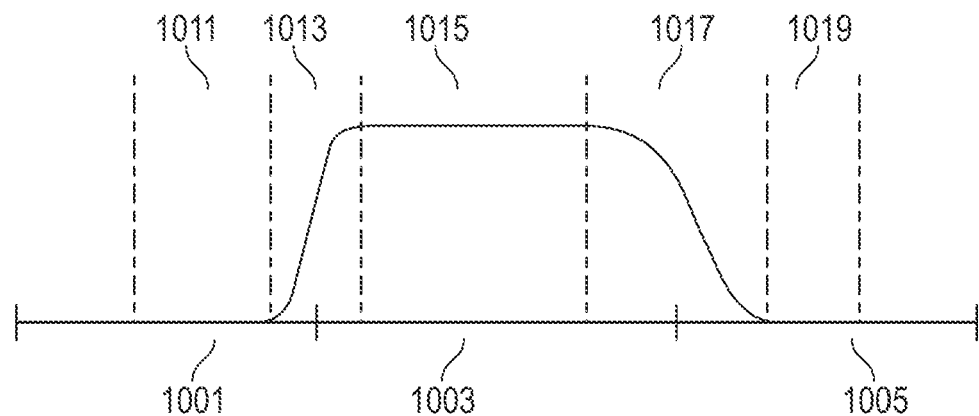
FIG. 10 is an illustrative drawing that depicts a window in accordance with some embodiments.

FIG. 10 is an illustrative drawing that depicts a window in accordance with some embodiments. FIG. 10 also depicts a sequence of three frames 1001, 1003, and 1005. For the sake of illustration, the window size associated with these frames will be defined respectively as $2M_0$, $2M_1$, and $2M_2$. The frame length will be denoted by N. The depicted window is further partitioned into five segments 1011, 1013, 1015, 1017, and 1019. FIG. 10 illustrates how a length $2M_1$ window that entirely spans frame 1003 may be constructed to transition from a window size of $2M_0$ at frame 1001 to a window size of $2M_2$ at frame 1003. In the depiction of FIG. 10, the length $2M_1$ window 1015 that entirely spans frame 1003 also spans the second half of frame 1001 and the first half of frame 1005 such that the length $2M_1$ of window 1015 is equal to twice the frame size N and thus $M_1=N$ for this example.

The window 1015 may be constructed as follows. Segment 1011 may consist of $$\frac{N - M_0}{2}$$

zeros. Segment 1013 may be of length $M_0$ and may comprise the left half (rising portion) of a length $2M_0$ window designed in accordance with the constraints discussed in Appendix A in section 4D. Segment 1015 may consist of $$N - \frac{M_0}{2} - \frac{M_2}{2}$$

ones. Segment 1017 may be of length $M_2$ and may comprise the right half (falling portion) of a length $2M_2$ window designed in accordance with the constraints discussed in section 4D of Appendix A. Segment 1019 may consist of $$\frac{N - M_2}{2}$$

zeros.

The example described in conjunction with the depiction of FIG. 10 corresponds to the case where frame 1003 is processed by one window. If the number of windows associated with frame 1003 is greater than one, the construction may proceed differently than described above. In some embodiments, a first window for a frame associated with more than one window may be constructed in five segments in the following way, where $m_0$ is defined as the minimum of $M_0$ and $M_1$ and M is defined as the maximum of $m_0$ and $M_1$: a first segment consisting of $$\frac{N - m_0}{2}$$

zeros, a second segment comprising the left half (rising portion) of a length $2m_0$ window designed in accordance with the constraints discussed in Appendix A, a third segment consisting of $$M - \frac{m_0}{2} - \frac{m_1}{2}$$

ones, a fourth segment 917 comprising the right half (falling portion) of a length $2M_1$ window designed in accordance with the constraints discussed in Appendix A, and a fifth segment consisting of $$\frac{M - M_1}{2}$$

zeros. In some embodiments, a last window for a frame associated with more than one window may be constructed in five segments in the following way, where $m_2$ is defined as the minimum of $M_1$ and $M_2$ and M is defined as the maximum of $m_2$ and $M_1$: a first segment consisting of $$\frac{M - M_1}{2}$$

zeros, a second segment comprising the left half (rising portion) of a length $2M_1$ window designed in accordance with the constraints discussed in section 4D of Appendix A, a third segment consisting of $$M - \frac{m_2}{2} - \frac{M_1}{2}$$

ones, a fourth segment 917 comprising the right half (falling portion) of a length $2m_2$ window designed in accordance with the constraints discussed in Appendix A, and a fifth segment consisting of $$\frac{M - m_2}{2}$$

zeros. In some embodiments, an intermediate window for a frame associated with more than one window may be constructed as a length $2M_1$ window designed in accordance with the constraints discussed in section 4D of Appendix A.

An MDCT embodiment such as that of FIGS. 6-7 may reduce the memory requirements of the implementation. As explained with respect to the illustration in FIG. 8, the embodiment of FIGS. 6-7 may allow for window switching with reduced latency in that the first half of a frame may be processed independently of the second half of a frame. In embodiments, such as that of FIG. 6-7, the decision to realize a transition window may require less lookahead and incur less latency than in other MDCT implementations such as that depicted in FIG. 5. In some embodiments, processing frames with windows and associated transforms whose sizes are related by powers of two may provide advantages in computational efficiency and data regularity.

While embodiments of the invention have been discussed in the context of audio signals, those of ordinary skill in the art will understand that it is within the scope of the invention to operate on different classes of signals other than audio signals.

APPENDIX

A mathematical framework for efficient implementation of
the modified discrete cosine transform in audio coders 1. Introduction This section describes a general mathematical framework for implementation of the modified discrete cosine transform in audio coders or other signal processing applications. The implementation features:

Good time-frequency localization.
Efficient computation using the DCT-IV.
Realization of windowing as a rotation matrix.
Flexible window design.
Flexible window switching with limited lookahead.

2. Definitions and Properties

2A. DCT-IV
The discrete cosine transform (DCT) of order N is the N×N matrix DAT defined by $$D_{k,n} = \cos\left(\frac{\pi}{4N}(2k+1)(2n+1)\right) \tag{5}$$

with $0 \leq k, n < N$, where k is the row index of the matrix and n is the column index. There are other variations of the DCT defined in the literature; this variation is referred to as the DCT-IV.

The DCT-IV as defined above satisfies the orthogonality condition $$D_N^T D_N = \frac{N}{2} I_N \tag{6}$$

where $I_N$ denotes the N×N identity matrix and the superscript T denotes a matrix transpose. Note that a scale factor of $$\sqrt{\frac{2}{N}}$$

in the definition of the DCT-IV would lead to the condition $D_N^T D_N = I_N$. Such scaling issues will be addressed in a later section.

2B. MDCT
The modified discrete cosine transform (MDCT) of order N is the N×2N matrix $C_N$ defined by $$C_{k,n} = \cos\left(\frac{\pi}{4N}(2k+1)(2n+N+1)\right) \tag{7}$$

with $0 \leq k < N$ and $0 \leq n < 2N$. This is also referred to as the forward MDCT.

2C. Relationship Between the MDCT and the DCT-IV
For N a power of 2, N>1, the MDCT and DCT-IV of order N are related by $$C_N = -D_N J_N \begin{bmatrix} -J & I & 0 & 0 \\ 0 & 0 & I & J \end{bmatrix}, \tag{8}$$

where J denotes the anti-identity matrix. The sub-matrices in the block matrix on the right are each of size $$\frac{N}{2} \times \frac{N}{2};$$

the size subscripts have been omitted from the equation for simplicity.

2D. Inverse MDCT

The inverse MDCT is the 2N×N matrix given by the transpose of the MDCT. This can be written using the block matrix formulation as $$C_N^T = -\begin{bmatrix} -J & 0 \\ I & 0 \\ 0 & I \\ 0 & J \end{bmatrix} J_N D_N^T \quad (9)$$

noting that $J_N^T = J_N$.

2E. Time-Domain Aliasing

The product of the inverse MDCT and the forward MDCT yields the 2N×2N matrix $$C_N^T C_N = \begin{bmatrix} -J & 0 \\ I & 0 \\ 0 & I \\ 0 & J \end{bmatrix} J_N D_N^T D_N J_N \begin{bmatrix} -J & I & 0 & 0 \\ 0 & 0 & I & J \end{bmatrix} \quad (10)$$

$$= \frac{N}{2}\begin{bmatrix} -J & 0 \\ I & 0 \\ 0 & I \\ 0 & J \end{bmatrix}\begin{bmatrix} -J & I & 0 & 0 \\ 0 & 0 & I & J \end{bmatrix} \quad (11)$$

$$= \frac{N}{2}\begin{bmatrix} I_N - J_N & 0 \\ 0 & I_N + J_N \end{bmatrix} \quad (12)$$

The off-diagonal elements in the sub-matrices (the $J_N$ terms) correspond to time-domain aliasing incurred in the MDCT.

2F. Normalization

To normalize the result of applying the forward and inverse MDCT successively, the forward and inverse MDCT are each scaled by a factor $$\sqrt{\frac{2}{N}}.$$

Furthermore, for the sake of computational efficiency, the forward MDCT and inverse MDCT may be realized in a codec as the negatives of the definitions given above. The MDCT as implemented in an encoder may be given by $$H_{k,n} = -\sqrt{\frac{2}{N}} \cos\left(\frac{\pi}{4N}(2k+1)(2n+N+1)\right) \quad (13)$$

(9)

and the inverse MDCT as implemented in the decoder may likewise be given by $$G_{n,k} = -\sqrt{\frac{2}{N}} \cos\left(\frac{\pi}{4N}(2k+1)(2n+N+1)\right) \quad (14)$$

with 0≤k<N and 0≤n<2N.

In matrix notation, the scaled forward and inverse transforms are $$H_N = -\sqrt{\frac{2}{N}} C_N = \sqrt{\frac{2}{N}} D_N J_N \begin{bmatrix} -J & I & 0 & 0 \\ 0 & 0 & I & J \end{bmatrix} \quad (15)$$

$$G_N = H_N^T \quad (16)$$

and the cascade of the forward and inverse transform yields $$G_N H_N = \begin{bmatrix} I_N - J_N & 0 \\ 0 & I_N + J_N \end{bmatrix}. \quad (17)$$

3. Windowing

In typical processing scenarios, a transform is applied to a segment of a signal extracted and weighted by a window function:

$$X_i[k] = \sum_{n=0}^{2N-1} w_i[n] x[n+iL] H_{k,n} \quad (18)$$

where the window function $w_i[n]$ may vary as a function of the frame index i and where $H_{k,n}$ are the kernel functions of the forward transform when viewed as functions of n.

Figure 11:
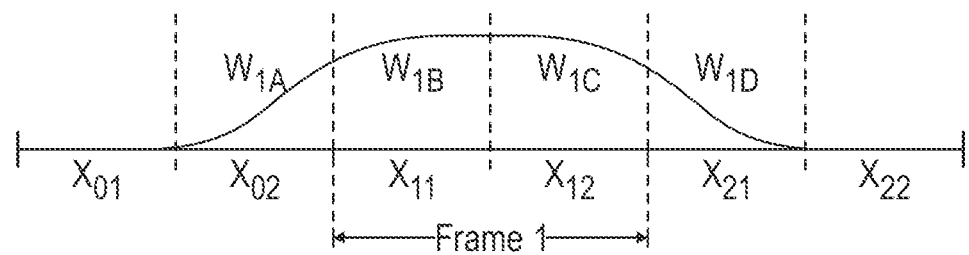
FIG. 11 is an illustrative drawing showing frame boundaries, signal segment boundaries and window segments.

FIG. 11 is an illustrative drawing showing frame boundaries, signal segment boundaries, and window segments. In matrix notation, the windowing and transform operations for a single frame (frame 1 in this case) can be expressed in accordance with the notation in FIG. 11 as $$X_1 = H_N W_1 \begin{bmatrix} x_{02} \\ x_{11} \\ x_{12} \\ x_{21} \end{bmatrix} \quad (19)$$

where $W_1$ is a 2N×2N diagonal matrix with the length-2N window $w_1[n]$ on the diagonal. As depicted in FIG. 1, the window $w_1[n]$ can be decomposed into four length $$-\frac{N}{2}$$

sub-windows $w_{1A}$, $w_{1B}$, $w_{1C}$ and $w_{1D}$ corresponding to the four sub-frames spanned by the full window. Defining $$\frac{N}{2} \times \frac{N}{2}$$

diagonal matrices $W_{1A}$, $W_{1B}$, $W_{1C}$ and $W_{1D}$ similarly as $W_1$ (with the corresponding sub-window on the diagonal), the windowing and MDCT operation from frame 1 can be further expressed as $$X_1 = H_N \begin{bmatrix} W_{1A} & 0 & 0 & 0 \\ 0 & W_{1B} & 0 & 0 \\ 0 & 0 & W_{1C} & 0 \\ 0 & 0 & 0 & W_{1D} \end{bmatrix} \begin{bmatrix} x_{02} \\ x_{11} \\ x_{12} \\ x_{21} \end{bmatrix}. \quad (20)$$

Using the above formulation of the MDCT, this can be rewritten as $$X_1 = \sqrt{\frac{2}{N}} D_N J_N \begin{bmatrix} -J & I & 0 & 0 \\ 0 & 0 & I & J \end{bmatrix} \begin{bmatrix} W_{1A} & 0 & 0 & 0 \\ 0 & W_{1B} & 0 & 0 \\ 0 & 0 & W_{1C} & 0 \\ 0 & 0 & 0 & W_{1D} \end{bmatrix} \begin{bmatrix} x_{02} \\ x_{11} \\ x_{12} \\ x_{21} \end{bmatrix} \quad (21)$$

$$X_1 = \sqrt{\frac{2}{N}} D_N J_N \begin{bmatrix} -JW_{1A} & W_{1B} & 0 & 0 \\ 0 & 0 & W_{1C} & W_{1D} \end{bmatrix} \begin{bmatrix} x_{02} \\ x_{11} \\ x_{12} \\ x_{21} \end{bmatrix} \quad (22)$$

The expression in Eq. (22) refactors the MDCT into a sequence of matrix operations. The vector on the rightmost side of Eq. (22) is a vector of signal values. A first matrix operation applied to the vector of signal values in the sequence of matrix operations corresponds at least in part to a windowing operation. A second matrix operation, which is applied to the result of the first matrix operation, corresponds at least in part to a DCT transform. Scaling and permutation operations may be incorporated in either the first or the second matrix operation. The result of the second matrix operation corresponds to the MDCT of the vector of signal values. The formulation in Eq. (22) represents the computation of the MDCT of a single vector or sequence of signal values. In Eqs. (20)-(22), the sliding-window MDCT is constructed by considering the matrix processing of a succession of signal vectors. This construction indicates that the sliding-window MDCT can be formulated as windowing rotation operations centered at frame boundaries (for the case of long windows) followed by transform operations corresponding at least in part to a DCT transform. For the case of shorter windows, the windowing rotation operation may be centered more generally at window transition boundaries.

4 the Sliding-Window MDCT

In signal processing applications such as audio coding, signals of arbitrary length are often processed via a sliding-window transform in which the window and transform operation is applied successively at regular intervals throughout the signal.

4A. Mathematical Formulation of the Forward MDCT

Using Eq. (18) as a basis, the sliding-window MDCT can be written in block diagonal form as $$\begin{bmatrix} \vdots \\ X_1 \\ X_1 \\ \vdots \end{bmatrix} = \mathcal{D}\mathcal{W} \begin{bmatrix} \vdots \\ x_{02} \\ x_{11} \\ x_{12} \\ x_{13} \\ x_{23} \\ x_{31} \\ \vdots \end{bmatrix} \quad (23)$$

where D and W are defined as block-diagonal matrices; note that the block-diagonal sub-matrices operate on successive frames of the input signal:

$$\mathcal{D} = \sqrt{\frac{2}{N}} \begin{bmatrix} \ddots & & \\ & D_N J_N & \\ & & D_N J_N \\ & & & \ddots \end{bmatrix} \quad (24)$$

$$W = \begin{bmatrix} \ddots & & & & & \\ & \boxed{\ldots JW_{1A} \quad W_{1B}} & & & & \\ & & W_{3C} \quad JW_{1D} & & & \\ & & \ldots JW_{2A} \quad W_{2B} & & & \\ & & & & W_{2C} \quad JW_{2D} & \\ & & & & \ldots JW_{3A} \quad W_{3B} & \\ & & & & & \ddots \end{bmatrix} \quad (25)$$

The construction of W can be understood by considering the correspondence of the boxed elements above to the single-frame formulation of the MDCT in Eq. (22). The boxed sub-matrix is applied to the frame 1 signal $[x_{02} x_{11} x_{12} x_{22}]^T$ as part of the computation of the transform $X_1$. Likewise, the subsequent two rows are applied to the frame 2 signal $[x_{12} \, x_{21} \, x_{22} \, x_{31}]^T$ as part of the computation of the transform X2. Note that the non-zero elements in these two rows have the same form as the boxed sub-matrix, but are respectively shifted over by N columns; this corresponds to an inter-frame hop size of N for the sliding-window transform.

Note that the windowing block matrix in Eq. (25) has a block-diagonal structure. The diagonal of the matrix consists of windowing rotation submatrices that are centered on frame boundaries as indicated by the boxed element in Eq. (26) below:

$$W = \begin{bmatrix} \ddots & & & & & \\ & \ldots JW_{1A} \quad W_{1B} & & & & \\ & & \boxed{W_{3C} \quad JW_{1D}} & & & \\ & & \boxed{\ldots JW_{2A} \quad W_{2B}} & & & \\ & & & & W_{2C} \quad JW_{2D} & \\ & & & & \ldots JW_{3A} \quad W_{3B} & \\ & & & & & \ddots \end{bmatrix} \quad (26)$$

The boxed element depicted in Eq. (22) corresponds to a windowing rotation operation carried out on the second half of frame 1 and the first half of frame 2 as expressed below:

$$\begin{bmatrix} W_{1C} & JW_{1B} \\ -JW_{2A} & W_{2B} \end{bmatrix} \begin{bmatrix} x_{12} \\ x_{21} \end{bmatrix} \quad (27)$$

where the matrix consists of zeros except for the diagonal (from the top left to the bottom right of the matrix) and the anti-diagonal (from the top right to the bottom left). The diagonal operates to scale the data in the vector; the anti-diagonal operates to negate the first half of the data in the vector, scale the vector, and flip the data around the center point to create a time-aliased version of the data. In full, the matrix thus operates to combine a scaled version of the data vector with a scaled and time-aliased version.

The structures of the matrices in Eqs. (24)-(27) gives rise to the pipeline in FIG. 6. Note that Eqs. (24)-(27) and FIG. 6 illustrate the windowing rotation operation and subsequent processing for the case of long windows, wherein the windowing operations are centered on frame boundaries. More generally, the windowing operations are centered on window transitions, for example in the case of shorter windows within a frame.

4B. The Inverse MDCT and Perfect Reconstruction

The block-diagonal formulation of the sliding-window MDCT can be used to establish conditions to achieve perfect reconstruction via a frame-by-frame inverse MDCT. Constraining the overall forward block-diagonal transformation to be orthogonal, the cascade of the forward and inverse transforms can be expressed as $$\vec{y} = W^H D^H D W \vec{x} = W^H W \vec{x} \qquad (28)$$

where the property $D^H D = I$ has been incorporated. Perfect reconstruction is thus achieved if $W^H W = I$, which requires that the N×N sub-matrices on the diagonal satisfy an orthonormality condition. Consider the highlighted square sub-matrix in the windowing matrix W in Eq. (26). From this, the required orthogonality condition for the window is:

$$\begin{bmatrix} W_{1C} & JW_{1D} \\ -JW_{2A} & W_{2B} \end{bmatrix}^H \begin{bmatrix} W_{1C} & JW_{1D} \\ -JW_{2A} & W_{2B} \end{bmatrix} = I_N \qquad (29)$$

where the condition as stated is for the overlap of frames 1 and 2. If the corresponding condition holds for all of the sub-matrices on the diagonal (i.e., all of the window overlap regions), then perfect reconstruction is achieved for the full sliding-window transform.

4C. Window Conditions for Perfect Reconstruction

The orthogonality condition in Eq. (29) can be equivalently written as $$\begin{bmatrix} W_{1C} & -W_{2A}J \\ W_{1D}J & W_{2B} \end{bmatrix} \begin{bmatrix} W_{1C} & JW_{1D} \\ -JW_{2A} & W_{2B} \end{bmatrix} = I_N, \qquad (30)$$

from which four sub-matrix conditions can be derived:

$$W_{1C}^2 + W_{2A}^2 = I \qquad (31)$$

$$W_{1D}^2 + W_{2B}^2 = I \qquad (32)$$

$$W_{1C}JW_{1D} - W_{2A}JW_{2B} = 0 \qquad (33)$$

$$W_1 JW_{1C} - W_{2B}JW_{2A} = 0. \qquad (34)$$

Note that the latter two are related by a transpose and are thus equivalent conditions. Recalling that the W sub-matrices are diagonal, the three sub-matrix conditions for perfect reconstruction can be equivalently expressed as time-domain conditions for the window segments $w_A[n]$, $w_B[n]$, $w_C[n]$, and $w_D[n]$:

$$w_{1C}[n]^2 + w_{2A}[n]^2 = 1 \qquad (35)$$

$$w_{1D}[n]^2 + w_{2B}[n]^2 = 1 \qquad (36)$$

$$w_{1D}[n]w_{1C}\left[\frac{N}{2} - 1 - n\right] - w_{2B}[n]w_{2A}\left[\frac{N}{2} - 1 - n\right] = 0 \qquad (37)$$

where $$0 \le n \le \frac{N}{2} - 1.$$

Using Eqs. (35) and (36), Eq. (37) can be rewritten as follows:

$$w_{1D}[n]^2 w_{1C}\left[\frac{N}{2} - 1 - n\right]^2 = w_{2B}[n]^2 w_{2A}\left[\frac{N}{2} - 1 - n\right]^2 \qquad (38)$$

$$(1 - w_{2B}[n]^2)\left(1 - w_{2A}\left[\frac{N}{2} - 1 - n\right]^2\right) = w_{2B}[n]^2 w_{2A}\left[\frac{N}{2} - 1 - n\right]^2 \qquad (39)$$

Similarly, $\qquad (40)$ $$w_{2C}\left[\frac{N}{2} - 1 - n\right]^2 + w_{1D}[n]^2 = 1. \qquad (41)$$

From Eqs. (35), (36), (40) and (41), the following relationships can be derived:

$$w_{2A}[n]^2 = w_1\left[\frac{N}{2} - 1 - n\right]^2 \qquad (42)$$

$$w_{2B}[n]^2 = w_{2C}\left[\frac{N}{2} - 1 - n\right]^2. \qquad (43)$$

Denoting the concatenation of the window segments $w_A[n]$ and $w_B[n]$ as $w_{AB}[n]$ (and similarly for $w_{CD}[n]$), the requirements on the window can be simplified to $$w_{1CD}[n]^2 + w_{1CD}[N - 1 - n]^2 = 1 \qquad (44)$$

$$w_{1CD}[n - 1 - n]^2 = w_{2AB}[n]^2 \qquad (45)$$

for $0 \le n \le N-1$. The first constraint means that the latter half of a frame's window must be power-complementary with its reverse (about its midpoint). The second constraint means that the reverse of the latter half of a frame's window must match the first half of the subsequent frame's window. Given those constraints, it follows that the first half of a frame's window must also be power-complementary with its reverse. Note however that all of the constraints apply to half of the window, meaning that the second half of a window can be designed independently from the first half, a property which will become important in the context of window switching.

If a symmetric window is assumed such that $$w[n] = w[2N - 1 - n] \qquad (46)$$

for $0 \le n \le N-1$, meaning that the relationship $$w_{AB}[n] = w_{CD}[N - 1 - n] \qquad (47)$$

holds for $0 \le n \le N-1$ for the window halves $w_{AB}[n]$ and $w_{CD}[n]$, then Eq. (45) can be simplified to $w_{1AB}[n]^2 = w_{2AB}[n]^2$ for $0 \le n \le N-1$ and Eq. (44) can be rewritten as $$w_{1AB}[n]^2 + w_{CD}[n]^2 = 1 \quad (51)$$

or, in terms of the full window w[n.]:

$$w[n]^2 + w[n+N]^2 = 1, \quad (52)$$

which is referred to as the Princen-Bradley condition [1].

5. Implementation of the Running MDCT

In this section, two different approaches for implementing the sliding-window or running MDCT (and inverse MDCT) are reviewed.

5A. Realization Using Sliding Windows

A typical implementation of the running MDCT consists of the following steps
- Frame the time-domain input signal to partition it into length-N adjacent segments.
- Apply a length-2N multiplicative window to 2N samples of the signal comprising N samples from the current frame and N additional samples from one or both of the preceding and subsequent frames.
- Apply an MDCT to the length-2N windowed segment. This MDCT is typically implemented using a computationally efficient approach such as the fast Fourier transform (FFT). The MDCT yields N spectral coefficients.
- Apply an inverse MDCT (again using efficient computation) to the N MDCT coefficients to derive 2N time-domain values.
- Apply a length-2N multiplicative window to the 2N outputs from the MDCT.
- Carry out overlap-add of the length-2N windowed segment with N previously generated output samples to derive N final output samples and N samples to store for overlap-add in the following iteration.

Running MDCTs are commonly implemented based on these steps or relatively minor variants. This series of operations is depicted in FIG. 5.

5B. Realization Using Orthogonal Transforms

Referring again to FIG. 6 there is shown an illustrative block diagram of an MDCT implementation based on rotations. Persons skilled in the art will appreciate that a rotation is a type of orthogonal transform.

When the windows used in the sliding-window MDCT satisfy the perfect reconstruction conditions derived above, the N×N sub-matrices on the diagonal of W are orthogonal matrices. The sliding-window MDCT and inverse MDCT can thus be implemented in this way:
- Framing to partition the time-domain signal in length-N adjacent segments.
- Orthogonal windowing transformation (rotation) covering the latter $$\frac{N}{2}$$

points of one frame and the initial $$\frac{N}{2}$$

points of the next. This can be interpreted as the N-point overlap between successive length-2N windows applied to the respective frames.
- DCT-IV applied to the latter half of one windowing rotation (e.g. the frame 0-1 overlap) and the initial half of the next (e.g. the frame 1-2 overlap); the result of this DCT-IV is the MDCT of the frame central to the two successive rotations (frame 1 in this example).
- Inverse DCT-IV applied to the output of the DCT-IV.
- Inverse windowing rotation applied to the latter half of the output of the inverse DCT-IV for one frame and the initial half of the output of the inverse DCT-IV for the next.
- Concatenation of the inverse windowing rotation results to form a time-domain output signal.

This series of operations is depicted in FIG. 6.

6. Window Switching

In audio coders, it is beneficial to adapt the window and transform based on the time-frequency behavior of the audio signal. For tonal signals, the use of long windows improves coding efficiency; on the other hand, the use of short windows for transient signals limits coding artifacts.

Figure 12:
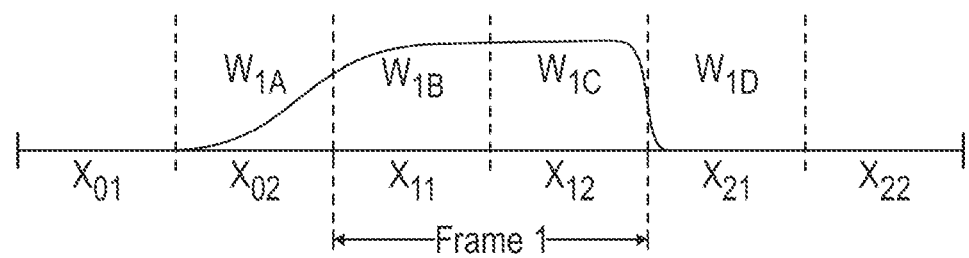
FIG. 12 is an illustrative drawing showing frame boundaries, signal segment boundaries, and window segments for a transition window.

In order to preserve perfect reconstruction, an asymmetric transition window is needed to adjust the window size. FIG. 12 is an illustrative drawing showing frame boundaries, signal segment boundaries, and window segments for a transition window. More particularly, FIG. 12 is an illustrative drawing showing a transition window for switching from long windows to short windows. Note that the transition window matches the long window behavior over the first half of the frame (segments A and B). With the MDCT decomposed into orthogonal rotations, this part of the window can be processed (and the computation of the MDCT for frame 1 can be initiated) prior to deciding on the window shape for the second half of the frame (segments C and D). This means that less lookahead is needed than in direct windowing methods where the entire window for a frame is applied prior to starting the MDCT computation. Note that the transition region in the second half of the window consists of a flat (constant-valued) region in segment C, the downward transition across the C-D boundary, and a flat (zero-valued) region in segment D.

Figure 13A:
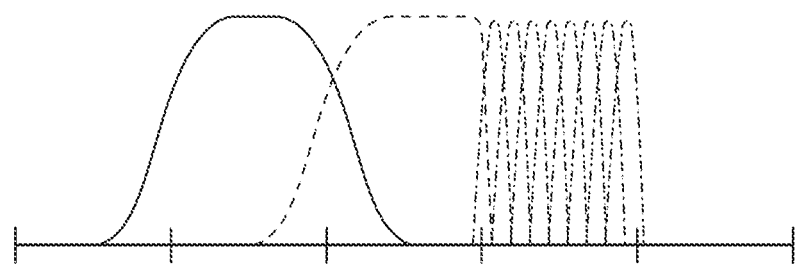
FIGS. 13(a), (b), (c), (d) are illustrative drawings showing examples of window-switching sequences which are readily supported by the coder and method of FIGS. 6-7.
Figure 13B:
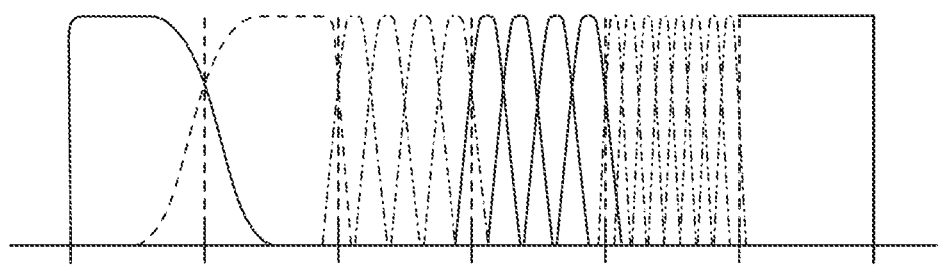
Figure 13C:
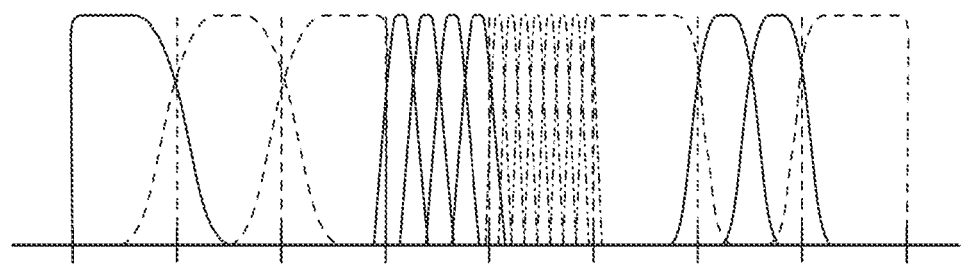
Figure 13D:
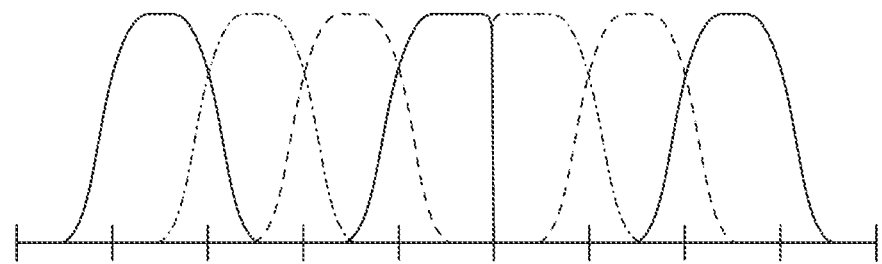

FIGS. 13(a), (b), (c), (d) are illustrative drawings showing examples of window-switching sequences which are readily supported in the orthogonal-rotation MDCT framework of FIGS. 6-7. FIG. 13(a) shows a transition from a long-window frame to a short window frame via an intermediate transition window such as that shown in FIG. 3. FIG. 13(b) shows a window sequence with multiple window-size transitions; it includes a start window at the beginning of the window sequence and a stop window at the end. FIG. 13(c) shows another sequence with multiple transitions. The start and stop windows can be used mid-stream as well, e.g. to establish sync points for switching between different coded streams. FIG. 13(d) shows a sequence of long windows with a mid-stream sync point comprising a stop window and start window in succession.

REFERENCES

[1] J. P. Princen, A. W. Johnson, and A. B. Bradley. Subband/transform coding using filter bank designs based on time-domain aliasing cancellation. In IEEE *Proc. Intl.*

Conference on Acoustics, Speech, and Signal Processing (ICASSP), page 2161-2164, 1987.

Example Hardware Implementation

Figure 14:
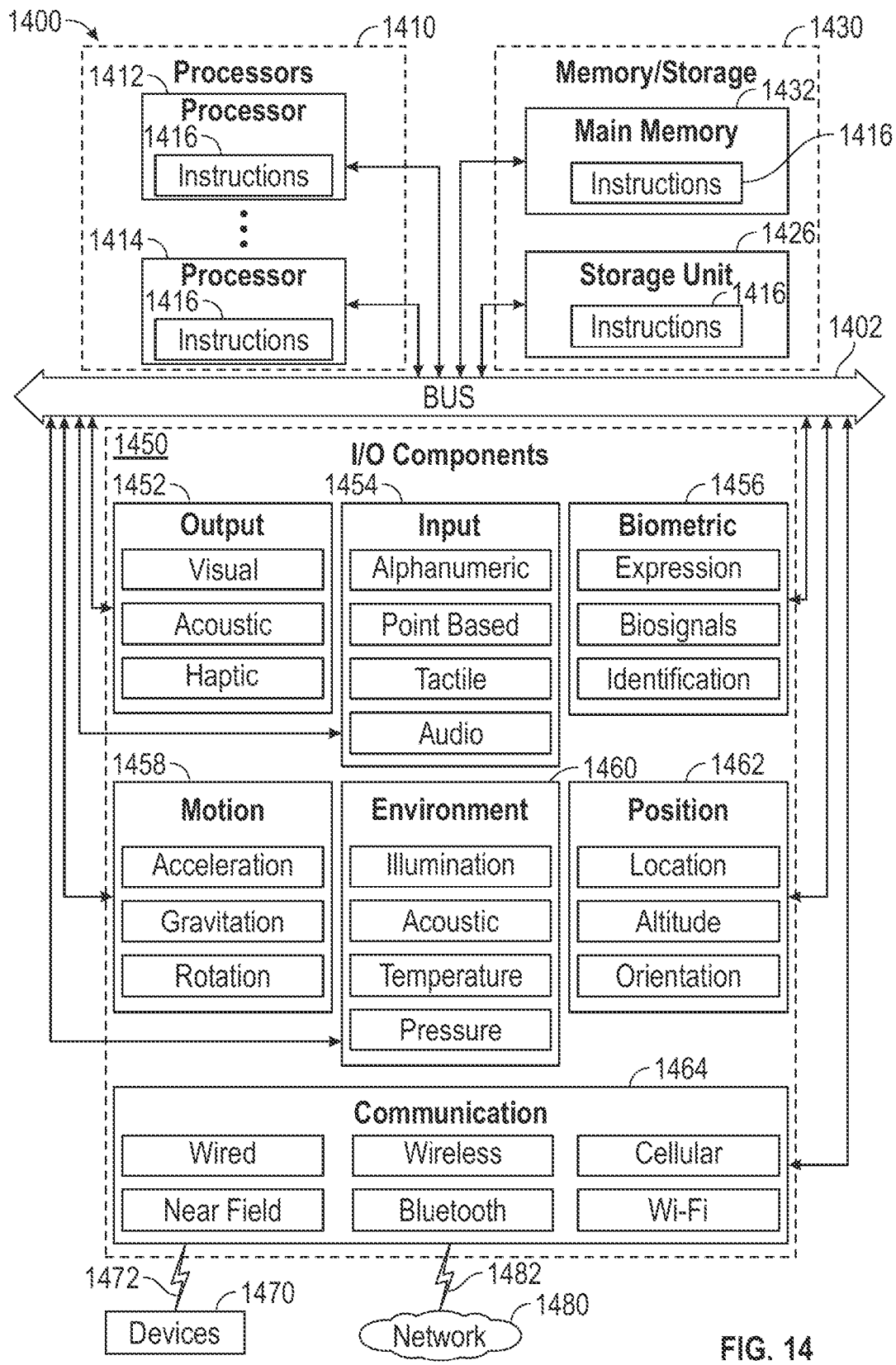
FIG. 14 is an illustrative block diagram illustrating components of a machine, according to some example embodiments, able to read instructions from a machine-readable medium (e.g., a machine-readable storage medium) and perform any one or more of the methodologies discussed herein.

FIG. 14 is an illustrative block diagram illustrating components of a machine 1400, according to some example embodiments, able to read instructions 1416 from a machine-readable medium (e.g., a machine-readable storage medium) and perform any one or more of the methodologies discussed herein. Specifically, FIG. 14 shows a diagrammatic representation of the machine 1400 in the example form of a computer system, within which the instructions 1416 (e.g., software, a program, an application, an applet, an app, or other executable code) for causing the machine 1400 to perform any one or more of the methodologies discussed herein may be executed. For example, the instructions 1416 can configure a processor 1410 to implement modules or circuits or components of FIGS. 4, 5 and 6, for example. The instructions 1416 can transform the general, non-programmed machine 1400 into a particular machine programmed to carry out the described and illustrated functions in the manner described (e.g., as an audio processor circuit). In alternative embodiments, the machine 1400 operates as a standalone device or can be coupled (e.g., networked) to other machines. In a networked deployment, the machine 1400 can operate in the capacity of a server machine or a client machine in a server-client network environment, or as a peer machine in a peer-to-peer (or distributed) network environment.

The machine 1400 can comprise, but is not limited to, a server computer, a client computer, a personal computer (PC), a tablet computer, a laptop computer, a netbook, a set-top box (STB), a personal digital assistant (PDA), an entertainment media system or system component, a cellular telephone, a smart phone, a mobile device, a wearable device (e.g., a smart watch), a smart home device (e.g., a smart appliance), other smart devices, a web appliance, a network router, a network switch, a network bridge, a headphone driver, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 can include or use processors 1410, such as including an audio processor circuit, non-transitory memory/storage 1430, and I/O components 1450, which can be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) can include, for example, a circuit such as a processor 1412 and a processor 1414 that may execute the instructions 1416. The term "processor" is intended to include a multi-core processor 1412, 1414 that can comprise two or more independent processors 1412, 1414 (sometimes referred to as "cores") that may execute the instructions 1416 contemporaneously. Although FIG. 14 shows multiple processors 1410, the machine 1100 may include a single processor 1412, 1414 with a single core, a single processor 1412, 1414 with multiple cores (e.g., a multi-core processor 1412, 1414), multiple processors 1412, 1414 with a single core, multiple processors 1412, 1414 with multiples cores, or any combination thereof, wherein any one or more of the processors can include a circuit configured to apply a height filter to an audio signal to render a processed or virtualized audio signal.

The memory/storage 1430 can include a memory 1432, such as a main memory circuit, or other memory storage circuit, and a storage unit 1136, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the cache memory of processor 1412, 1414), or any suitable combination thereof, during execution thereof by the machine 1400. Accordingly, the memory 1432, the storage unit 1436, and the memory of the processors 1410 are examples of machine-readable media.

As used herein, "machine-readable medium" means a device able to store the instructions 1416 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions 1416, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a variety of components to receive input, provide output, produce output, transmit information, exchange information, capture measurements, and so on. The specific I/O components 1450 that are included in a particular machine 1400 will depend on the type of machine 1100. For example, portable machines such as mobile phones will likely include a touch input device or other such input mechanisms, while a headless server machine will likely not include such a touch input device. It will be appreciated that the I/O components 1450 may include many other components that are not shown in FIG. 10. The I/O components 1450 are grouped by functionality merely for simplifying the following discussion, and the grouping is in no way limiting. In various example embodiments, the I/O components 1450 may include output components 1452 and input components 1454. The output components 1452 can include visual components (e.g., a display such as a plasma display panel (PDP), a light emitting diode (LED) display, a liquid crystal display (LCD), a projector, or a cathode ray tube (CRT)), acoustic components (e.g., loudspeakers), haptic components (e.g., a vibratory motor, resistance mechanisms), other signal generators, and so forth. The input components 1454 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1450 can include biometric components 1456, motion components 1458, environmental components 1460, or position components 1462, among a wide array of other components. For example, the biometric components 1456 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like, such as can influence a inclusion, use, or selection of a listener-specific or environment-specific impulse response or HRTF, for example. In an example, the biometric components 1156 can include one or more sensors configured to sense or provide information about a detected location of the listener in an environment. The motion components 1458 can include acceleration sensor components (e.g., accelerometer), gravitation sensor components, rotation sensor components (e.g., gyroscope), and so forth, such as can be used to track changes in the location of the listener. The environmental components 1460 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect reverberation decay times, such as for one or more frequencies or frequency bands), proximity sensor or room volume sensing components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 can include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1450 can include communication components 1464 operable to couple the machine 1400 to a network 1480 or devices 1470 via a coupling 1482 and a coupling 1472 respectively. For example, the communication components 1464 can include a network interface component or other suitable device to interface with the network 1480. In further examples, the communication components 1464 can include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 can be another machine or any of a wide variety of peripheral devices (e.g., a peripheral device coupled via a USB).

Moreover, the communication components 1464 can detect identifiers or include components operable to detect identifiers. For example, the communication components 1464 can include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF49, Ultra Code, UCC RSS-2D bar code, and other optical codes), or acoustic detection components (e.g., microphones to identify tagged audio signals). In addition, a variety of information can be derived via the communication components 1064, such as location via Internet Protocol (IP) geolocation, location via Wi-Fi® signal triangulation, location via detecting an NFC beacon signal that may indicate a particular location, and so forth. Such identifiers can be used to determine information about one or more of a reference or local impulse response, reference or local environment characteristic, or a listener-specific characteristic.

In various example embodiments, one or more portions of the network 1480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1080 can include a wireless or cellular network and the coupling 1082 may be a Code Division Multiple Access (CDMA) connection, a Global System for Mobile communications (GSM) connection, or another type of cellular or wireless coupling. In this example, the coupling 1482 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology. In an example, such a wireless communication protocol or network can be configured to transmit headphone audio signals from a centralized processor or machine to a headphone device in use by a listener.

The instructions 1416 can be transmitted or received over the network 1480 using a transmission medium via a network interface device (e.g., a network interface component included in the communication components 1064) and using any one of a number of well-known transfer protocols (e.g., hypertext transfer protocol (HTTP)). Similarly, the instructions 1416 can be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

While the above detailed description has shown, described, and pointed out novel features as applied to various embodiments, it will be understood that various omissions, substitutions, and changes in the form and details of the devices or algorithms illustrated can be made without departing from the scope of the disclosure. As will be recognized, certain embodiments of the inventions described herein can be embodied within a form that does not provide all of the features and benefits set forth herein, as some features can be used or practiced separately from others.

Moreover, although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims.

What is claimed is:

1. A method for encoding an audio signal, comprising:
applying a first transformation to a first portion of a current frame to obtain a first transformation result prior to receiving a subsequent frame; and
encoding a preceding frame using the first transformation result;
wherein the preceding frame, the current frame, and the subsequent frame are consecutive frames of the audio signal.

2. The method of claim 1, wherein the first transformation is a windowing rotation.

3. The method of claim 1, wherein encoding the preceding frame further comprises combining a portion of the first transformation result with a portion of a transformation result from the preceding frame to form an intermediate encoding result for the preceding frame.

4. The method of claim 3, wherein encoding the preceding frame further comprises applying a second transformation to the intermediate encoding result for the preceding frame.

5. The method of claim 4, wherein the second transformation is a discrete cosine transform.

6. The method of claim 1, further comprising: receiving the subsequent frame;
applying a third transformation to a first portion of the subsequent frame to obtain a third transformation result; and encoding the current frame using the third transformation result.

7. The method of claim 6, further comprising combining a portion of the third transformation result with a portion of a transformation result from the current frame to form an intermediate encoding result for the current frame.

8. The method of claim 7, wherein encoding the current frame further comprises applying a fourth transformation to the intermediate encoding result for the current frame.

9. The method of claim 8, wherein the fourth transformation is a discrete cosine transform.

* * * * *